(12) United States Patent
Tamura

(10) Patent No.: US 9,883,068 B2
(45) Date of Patent: Jan. 30, 2018

(54) IMAGING UNIT, IMAGE READING DEVICE, AND IMAGE FORMING APPARATUS

(71) Applicant: Asato Tamura, Tokyo (JP)

(72) Inventor: Asato Tamura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 32 days.

(21) Appl. No.: 15/011,770

(22) Filed: Feb. 1, 2016

(65) Prior Publication Data

US 2016/0227065 A1 Aug. 4, 2016

(30) Foreign Application Priority Data

Feb. 4, 2015 (JP) .................................. 2015-020474

(51) Int. Cl.
 *H04N 1/024* (2006.01)
 *H04N 1/028* (2006.01)
 *H04N 1/00* (2006.01)

(52) U.S. Cl.
 CPC ....... *H04N 1/0249* (2013.01); *H04N 1/00989* (2013.01); *H04N 1/024* (2013.01); *H04N 1/028* (2013.01)

(58) Field of Classification Search
 CPC .................................................. H04N 1/00249
 See application file for complete search history.

(56) References Cited

U.S. PATENT DOCUMENTS

| 4,705,205 A | * | 11/1987 | Allen | ....................... | B23K 3/06 |
| | | | | | 228/180.22 |
| 5,944,538 A | * | 8/1999 | Sorig | .................... | H01R 12/585 |
| | | | | | 439/82 |
| 2008/0075406 A1 | * | 3/2008 | Kadomi | ................. | G02B 6/262 |
| | | | | | 385/79 |
| 2012/0060789 A1 | * | 3/2012 | Yun | .......................... | F16J 1/18 |
| | | | | | 123/193.6 |

FOREIGN PATENT DOCUMENTS

| JP | 2011-18747 | | 1/2011 |
| JP | 2011018747 A | * | 1/2011 |
| JP | 2012-238962 | | 12/2012 |

* cited by examiner

*Primary Examiner* — Ibrahim Siddo
(74) *Attorney, Agent, or Firm* — Oblon, McClelland, Maier & Neustadt, L.L.P.

(57) ABSTRACT

An imaging unit includes an image pickup element extending along a surface parallel to an imaging surface, a circuit board including a circuit to drive the image pickup element, and a plurality of fixing members to fix the image pickup element and the circuit board. The circuit board includes at least one through hole on a straight line that extends in a longitudinal direction of the image pickup element and is provided with the plurality of the fixing members. The through hole is provided at a position between at least two of the plurality of the fixing members on the straight line.

8 Claims, 25 Drawing Sheets

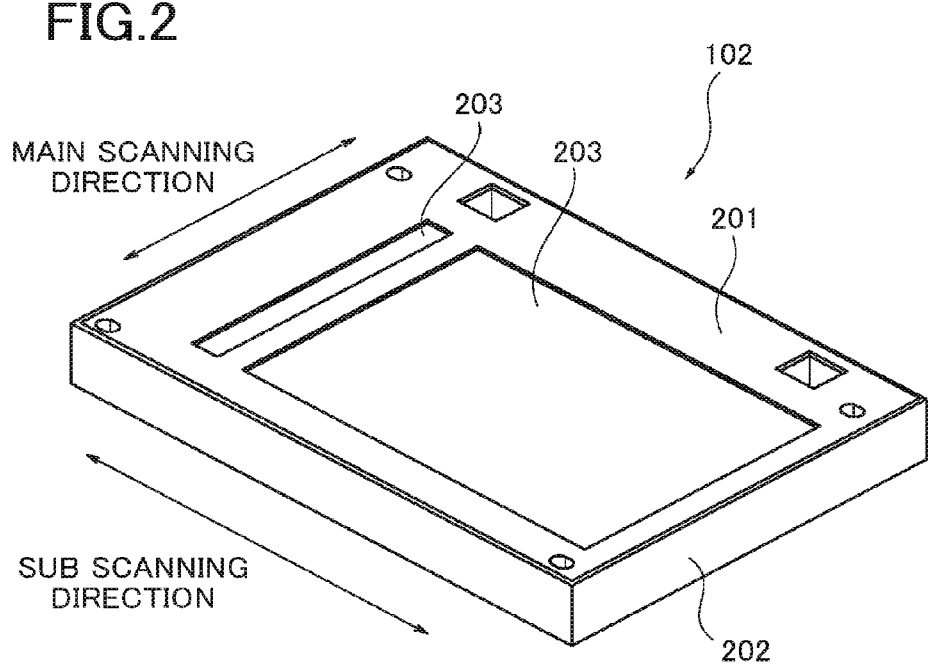
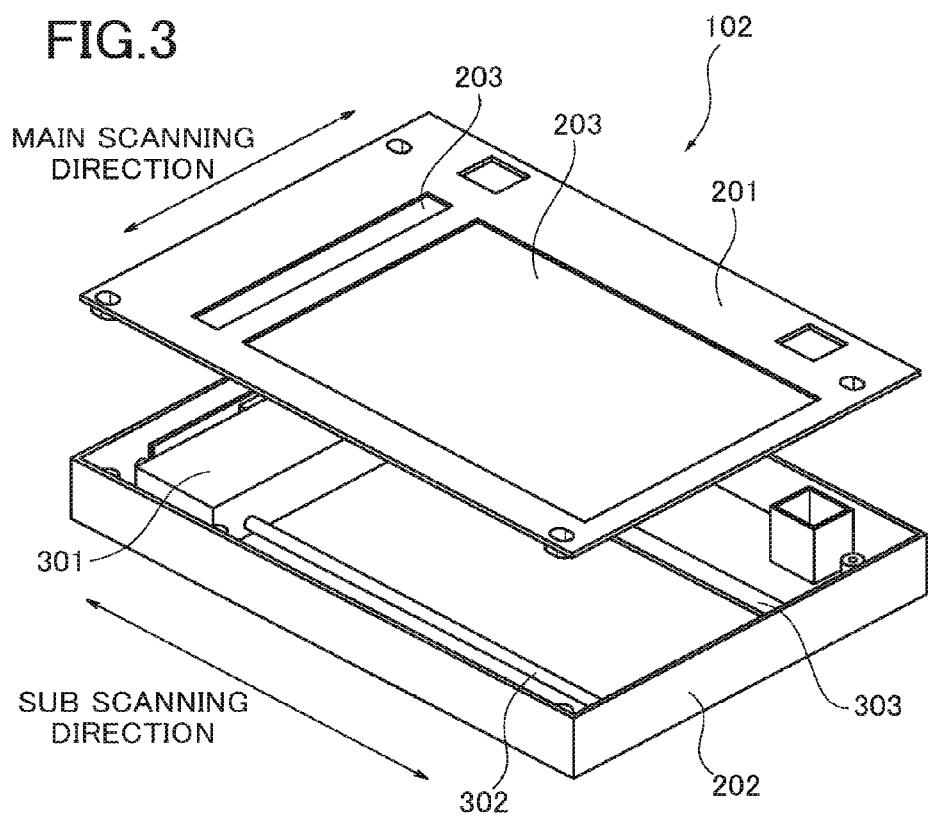

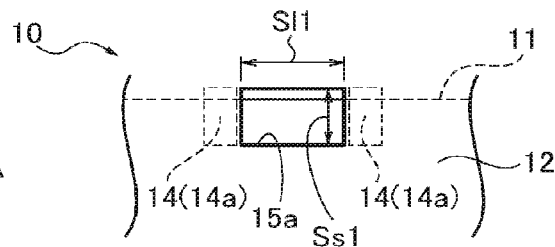
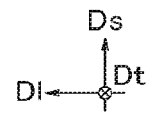
FIG.21A
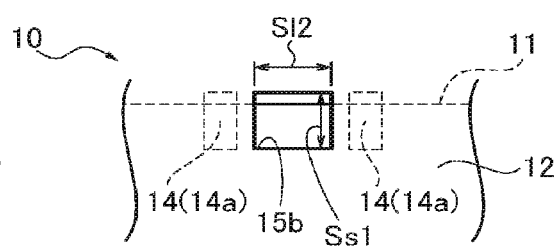
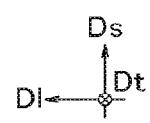
FIG.21B
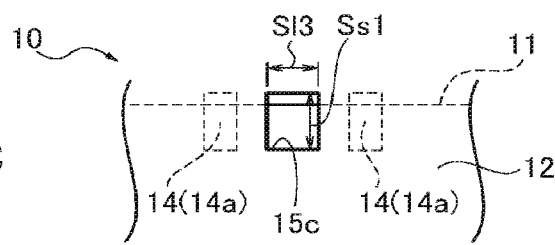
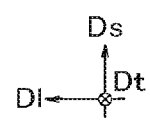
FIG.21C
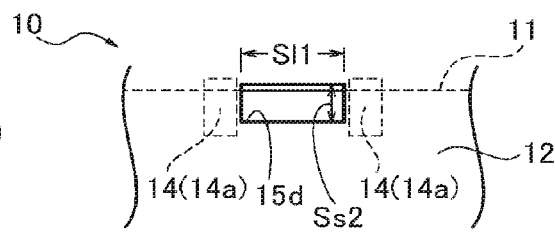
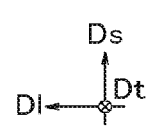
FIG.21D
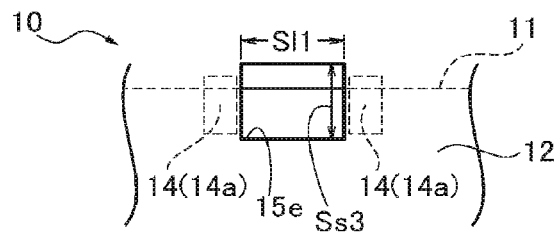
FIG.21E

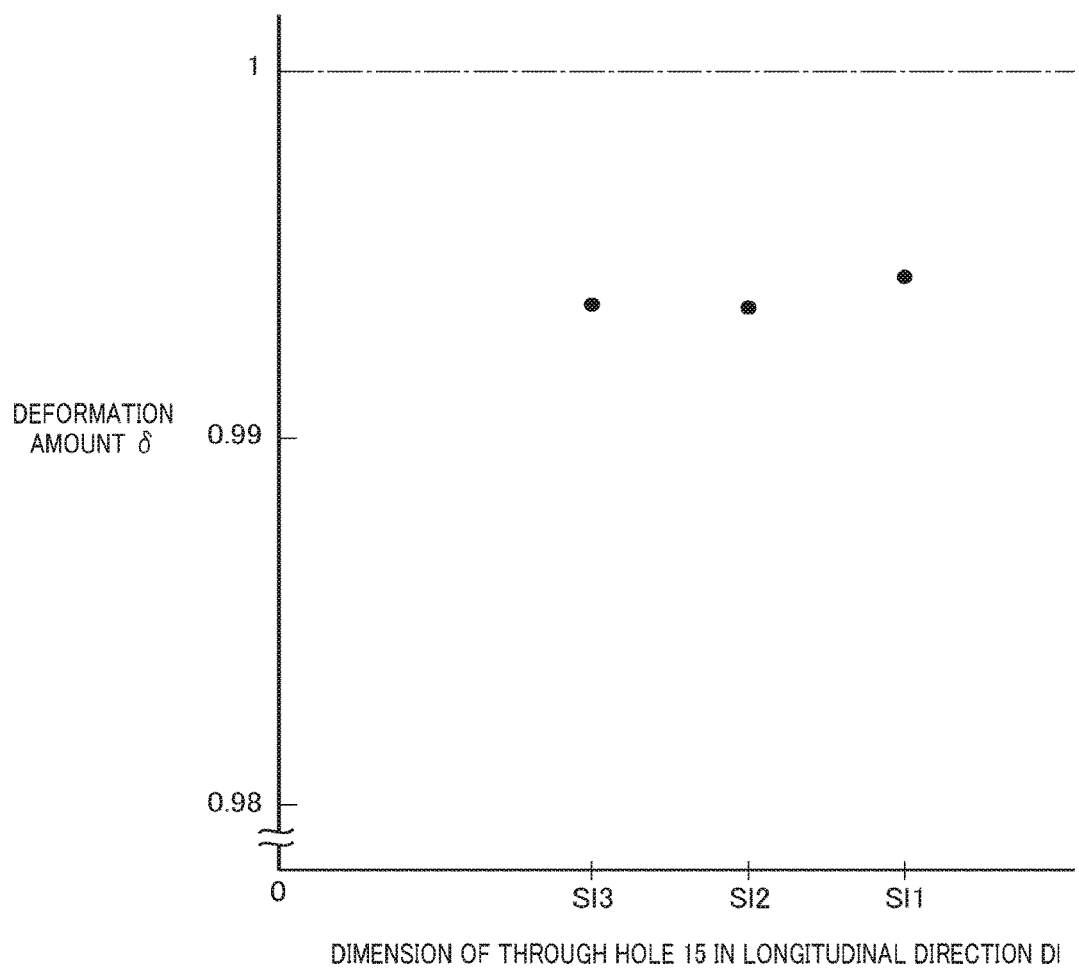

IMAGING UNIT, IMAGE READING DEVICE, AND IMAGE FORMING APPARATUS

CROSS-REFERENCE TO RELATED APPLICATION

The present application is based on and claims priority to Japanese patent application No. 2015-20474, filed Feb. 4, 2015, the disclosure of which is hereby incorporated by reference herein in its entirety.

BACKGROUND

Technical Field

This disclosure relates to an imaging unit, an image reading device, and an image forming apparatus.

Description of Related Art

Conventionally, imaging units have been used in digital cameras or scanners and are configured to mount, on the circuit board thereof, image pickup elements such as CCDs and CMOSs and/or ICs. As is known, these imaging units generate heat as energized.

In imaging units, linear expansion coefficients of the image pickup elements and of the circuit board generally differ from each other. For instance, the linear expansion coefficient of the image pickup elements is smaller than that of the circuit board. That is, the expansion amount of the image pickup elements is different from that of the circuit board. Accordingly, when the image pickup elements and the circuit board respectively expand in the different expansion coefficients due to the heat generation or the like, the image pickup elements may be deformed by stress caused by the expansion. As a result, the imaging surface of the imaging unit is deformed or bent, and thus the optical performance of the imaging unit may be deteriorated due to a change of the optical path length caused by the deformation.

To avoid this problem, Patent Literature 1 (Japanese Laid-Open Patent Publication 2011-18747) teaches to provide, on the surface of the circuit board opposite to the surface mounting the image pickup element, a low thermal expansion member having a low thermal expansion coefficient. The low thermal expansion member has a smaller expansion coefficient than the circuit board. By having the low thermal expansion member, the imaging unit can sufficiently absorb the stress caused by the thermal expansion of the circuit board during a heating treatment for mounting the image pickup element on the circuit board. Consequently, the imaging unit of PL1 can suppress a deformation of the image pickup element generated by stress on the circuit board caused by a temperature change.

SUMMARY

Since the imaging unit of PL1 needs to have the low thermal expansion member to suppress the deformation of the image pickup unit, it increases the cost to provide the imaging unit.

An object of the present invention is, therefore, to provide an imaging unit that can suppress a deformation of an image pickup element caused by a temperature change without an additional member.

To achieve the above object, an aspect of the present invention provides an imaging unit includes an image pickup element extending along a surface parallel to an imaging surface, a circuit board including a circuit to drive the image pickup element, and a plurality of fixing members to fix the image pickup element and the circuit board. The circuit board includes at least one through hole on a straight line that extends in a longitudinal direction of the image pickup element and is provided with the plurality of the fixing members. The through hole is provided at a position between at least two of the plurality of the fixing members on the straight line.

BRIEF DESCRIPTION OF DRAWINGS

FIG. 2 is a perspective view schematically illustrating a configuration of an image reader;

FIG. 3 is a perspective view schematically illustrating the disassembled image reader;

FIG. 21A is an explanatory view illustrating the through hole on the circuit board in a fifth verification;

FIG. 21B is an explanatory view illustrating the through hole having a different dimension from the hole illustrated in FIG. 21A in the fifth verification;

FIG. 21C is an explanatory view illustrating the through hole having a different dimension from the holes illustrated in FIGS. 21A and 21B in the fifth verification;

FIG. 21D is an explanatory view illustrating the through hole having a different dimension from the holes illustrated in FIG. 21A to 21C in the fifth verification;

FIG. 21E is an explanatory view illustrating the through hole having a different dimension from the holes illustrated in FIG. 21A to 21D in the fifth verification;

FIG. 22 is a graph showing deformation amounts of the image pickup element measured in the longitudinal direction Dl where the ordinate denotes the deformation amount δ and the abscissa denotes the dimension of the through holes in the longitudinal direction Dl;

DETAILED DESCRIPTION

Hereinafter, an imaging unit, an image reading device including the imaging unit, and an image forming apparatus including the image reading device will be described with reference to the drawings.

Embodiment 1

An example of an imaging unit 10 of a first embodiment according to this disclosure will be described with reference to FIGS. 1 to 25. Besides, an example of an image reader 102 including the imaging unit 10 of the first embodiment according to this disclosure and an image forming apparatus 100 including the image reading device of the first embodiment according to this disclosure will also be described.

Figure 1:
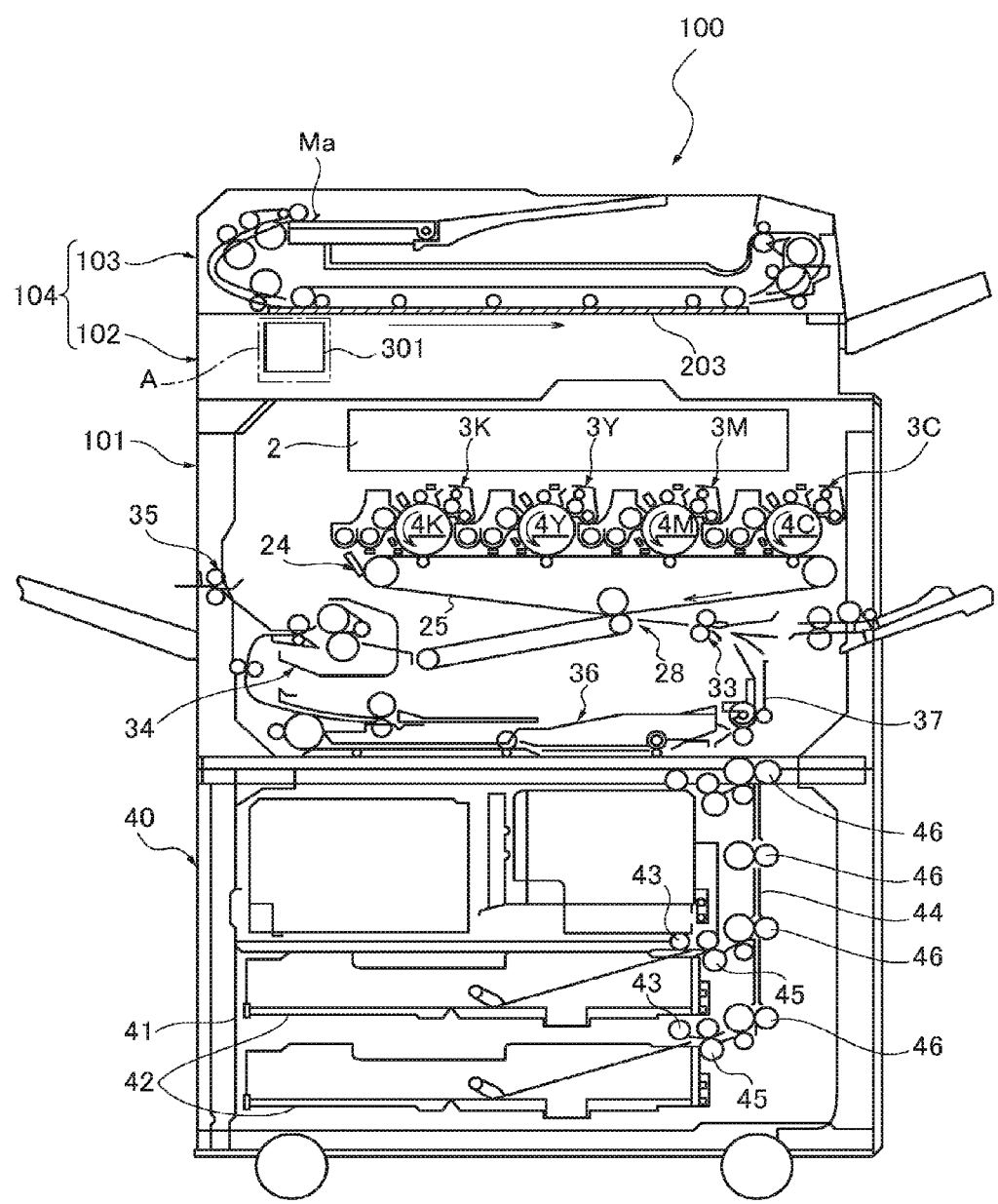
FIG. 1 is an explanatory view schematically illustrating an image forming apparatus including an example of an imaging unit of a first embodiment according to the present invention.
Figure 8:
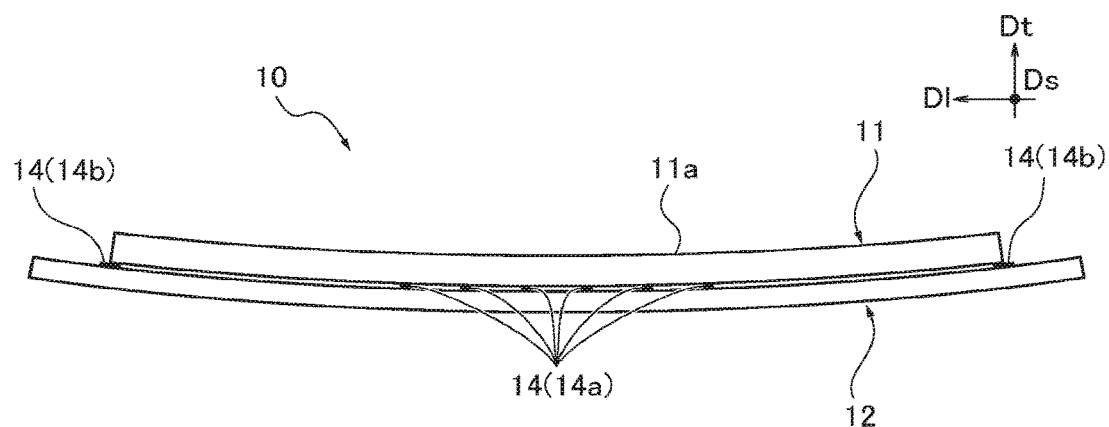
FIG. 8 is an explanatory view illustrating an image pickup element that is mounted on the circuit board and is being deformed.
Figure 10:
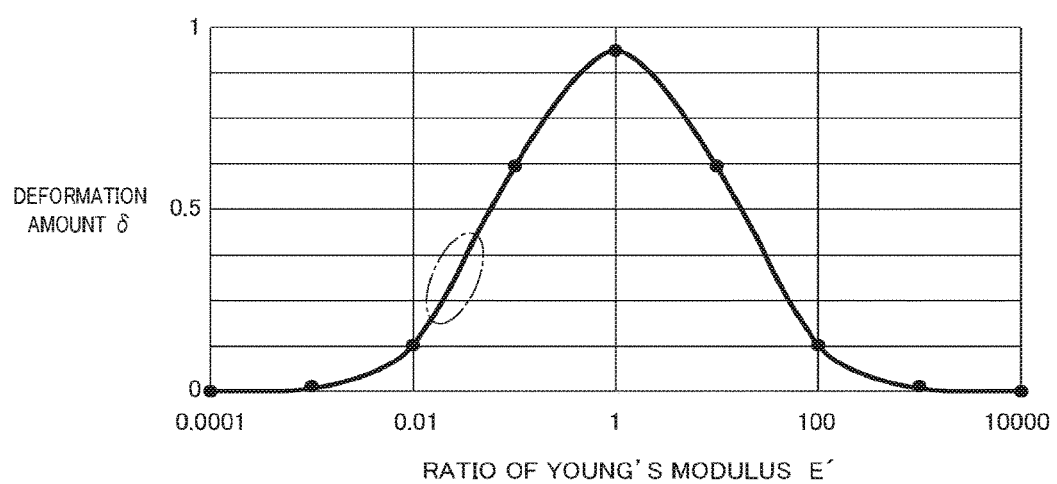
FIG. 10 is a graph showing a deformation of the test piece where the ordinate denotes a deformation amount δ and the abscissa denotes a ratio of Young's modulus E'.

In FIG. 1, a configuration of the image forming apparatus 100 is illustrated schematically to facilitate understanding the configuration. In FIGS. 6, 7, 8, 11, 13, 16, 18, 21A to 21E, 24, and 25, the imaging unit 10 is illustrated without a translucent member 13 to facilitate understanding the configuration of the imaging unit 10. In FIG. 8, a deformation of an image pickup element 11 and a circuit board 12 is exaggeratedly illustrated to facilitate understanding. In the ordinate of FIG. 10, deformation amounts δ are standardized with a value close to the maximum value. In the ordinates of FIGS. 12, 14, 17, 19, 22, and 23, deformation amounts δ are standardized with a deformation amount without a through hole 15. In the ordinates of FIGS. 15 and 20, deformation suppressing efficiencies represent ratios of the deformation amounts against an area of the through holes and are standardized with a value close to the maximum value.

A copying machine, a facsimile, or a printing device may be applied as an example of the image forming apparatus. As illustrated in FIG. 1, the image forming apparatus 100 includes an image forming section 101, a paper feeding device 40, a document conveying and reading unit 104, and a controller that controls operations thereof. The controller includes a CPU to integrally control the image forming apparatus 100, a storage such as a ROM, RAM and HDD to store data and programs. In the controller, the CPU reads out the program stored in the storage and executes it to achieve the operations of the image forming apparatus 100.

The document conveying and reading unit 104 includes an image reader 102 fixed on the image forming section 101 and an auto document feeder (ADF) 103 (which may also be called as a document conveying device) supported by the image reader 102.

The paper feeding device 40 includes two paper feeding cassettes 42 provided in multiple stages inside a paper container 41, a delivering roller 43 to deliver papers (recording medium) from the paper feeding cassettes 42, a separation roller 45 to separate the delivered papers and feed them to a first paper feeding path 44. The paper feeding device 40 further includes a plurality of conveying rollers 46 to convey papers to a second paper feeding path 37 of the image forming apparatus 100. That is, the paper feeding device 40 feeds the papers stored in the paper feeding cassettes 42 to the second paper feeding path 37 of the image forming apparatus 100.

As described later, the image forming section 101 forms an image on the recording medium in accordance with image information read by the image reader 102 or image information input from outside. The image forming section 101 includes an optical writing device 2, four process units 3K, 3Y, 3M, 3C to form toner images of black (K), yellow (Y), magenta (M), and cyan (C) colors. Further, the image forming section 101 includes a transfer unit 24 having an intermediate transfer belt 25, a paper conveying unit 28, a pair of registration rollers 33, a fixing device 34, a pair of paper ejection rollers 35, a switchback device 36, the second paper feeding path 37, and the like. The image forming section 101 drives a light source such as a laser diode and an LED provided inside the optical writing device 2 so as to emit a laser beam toward the photoconductors 4K, 4Y, 4M, 4C of the corresponding process units 3K, 3Y, 3M, 3C. Upon receiving the emitted laser beam, each of the photoconductors 4K, 4Y, 4M, 4C forms an electrostatic latent image on a drum-shaped surface thereof. Through a specific developing process, the electrostatic latent images are each developed as a toner image. In this specification, the element indicated with the letter K, Y, M, or C represents the element for the color of black (K), yellow (Y), magenta (M), or Cyan (C).

In the image forming apparatus 100, the toner images formed on the surface of the photoconductors 4K, 4Y, 4M, and 4C are sequentially superimposed onto the intermediate transfer belt 25 that continuously rotates in the clockwise direction (primary transfer). With this primary transfer, a colored toner image obtained by superimposing the four colors is formed on the intermediate transfer belt 25. In the image forming apparatus 100, a paper fed from the paper feeding device 40 is, by the pair of registration rollers 33, delivered to a secondary transfer nip defined between the paper conveying unit 28 and intermediate transfer belt 25 at a predetermined interval. Accordingly, the image forming apparatus 100 transfers the colored toner image of the intermediate transfer belt 25 to the fed paper (secondary transfer). The paper passed through the secondary transfer nip is then conveyed to the fixing device 34 from the intermediate transfer belt 25. The paper conveyed to the fixing device 34 is pressurized and heated therein, such that the full-colored image on the paper is fixed on the paper. The paper is then delivered from the fixing device 34 to the pair of paper ejection rollers 35 so as to be ejected outside. Note that the image forming section 101 should not be limited to an electrophotography-type shown in FIG. 1, and may be an ink jet recording-type or the like.

As illustrated in FIGS. 2 and 3, the image reader 102 disposed on the image forming section 101 includes, as a housing, a scanner cover 201 forming the upper surface of the image reader 102 and a scanner frame 202 forming the side walls and bottom surface. The scanner cover 201 has a contact glass 203 as a manuscript table to place or to pass a manuscript Ma.

As illustrated in FIG. 3, an integrally formed scanning optical unit 301 to read a reflection light after irradiating the manuscript Ma placed on the contact glass 203 with a light, and a guide rod 302 and a rail 303 to move the integrally formed scanning optical unit 301 along the sub-scanning direction are provided inside the image reader 102. As illustrated in FIG. 1, the integrally formed scanning optical unit 301 is provided just under the contact glass 203 and is movable in the sub-scanning direction (in the left-and-right direction on the paper). The integrally formed scanning optical unit 301 integrally configures a unit with a light source, a reflection mirror, an imaging forming lens, and an image sensor such as a CCD, and reads image information of the manuscript Ma placed on the contact glass 203. The integrally formed scanning optical unit 301 irradiates the manuscript Ma using the light source, reflects the light reflected by the manuscript Ma using the reflection mirror, images the reflected light on the image sensor using the imaging forming lens, and reads the manuscript Ma as the image information (data).

When reading the image of the manuscript Ma delivered by the ADF 103, the integrally formed scanning optical unit 301 moves to and stops at a position A (shown in FIG. 1). The integrally formed scanning optical unit 301 emits the light from the light source when the manuscript Ma delivered by the ADF 103 passes on the contact glass 203. By sequentially reflecting the emitted light by the manuscript Ma, the integrally formed scanning optical unit 301 reads the manuscript Ma as the image information (data) using the plurality of reflection mirrors, the imaging forming lens, and the image sensor.

When reading the image of the manuscript Ma placed on the contact glass 203, the integrally formed scanning optical unit 301 moves toward the right side on the paper (in the sub-scanning direction) from the position A. The integrally formed scanning optical unit 301 emits the light from the light source to the manuscript Ma on the contact glass 203 as moving in the sub-scanning direction. The integrally formed scanning optical unit 301 reflects the emitted light on the manuscript Ma and reads the manuscript Ma as the image information using the plurality of reflection mirrors, the imaging forming lens, and the image sensor.

As described above, the image reader 102 reads the manuscript Ma as the image information using the integrally formed scanning optical unit 301. That is, the image reader 102 corresponds to an example of the image reading device according to the first embodiment of this disclosure. The image reader 102 sends the read image information to the image forming section 101. As described above, the image forming section 101 forms an image on the recording medium (paper) based on the read image information. The image forming apparatus 100 includes the imaging unit 10 of the first embodiment as an image sensor for the integrally formed scanning optical unit 301 of the image reader 102.

Figure 4:
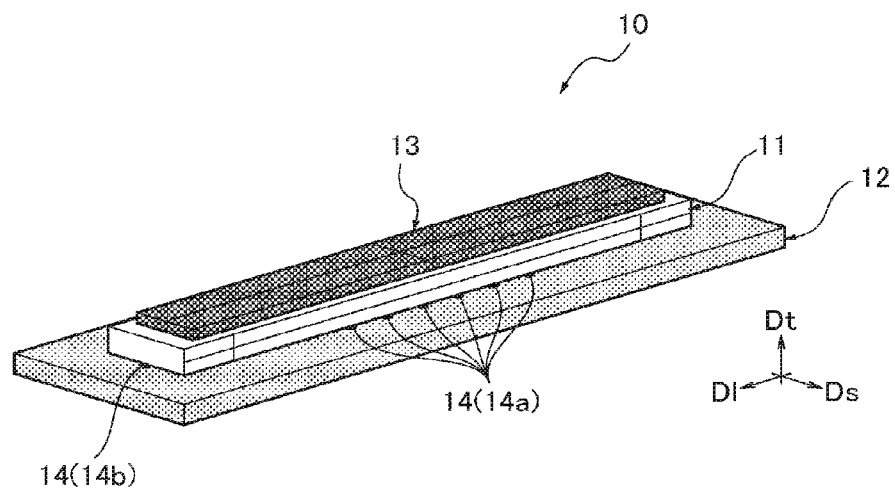
FIG. 4 is a perspective view schematically illustrating a configuration of the imaging unit.
Figure 5:
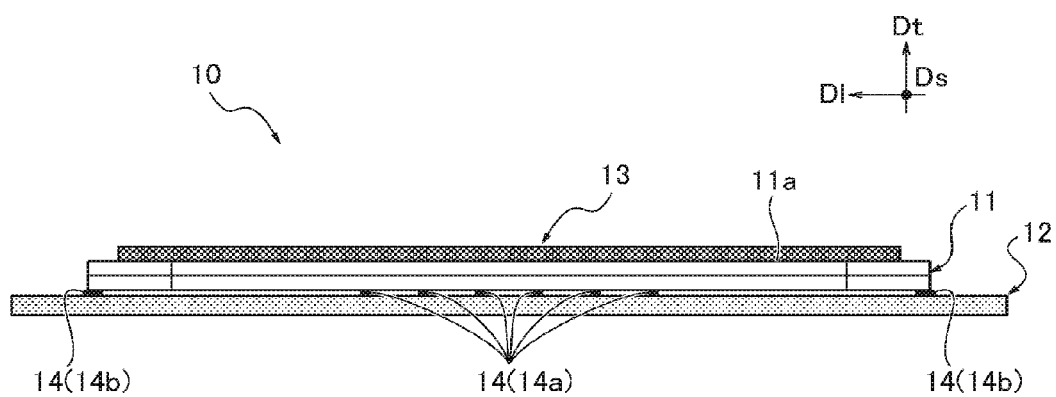
FIG. 5 is a side view schematically illustrating the configuration of the imaging unit.

As illustrated in FIGS. 4 and 5, the imaging unit 10 mounts the image pickup element 11 on the circuit board 12 and provides the translucent member 13 on the image pickup element 11. The image pickup element 11 is a solid-state imaging sensor that converts an object image imaged on an imaging surface 11a into an electrical signal (image information) and outputs the signal. That is, the image pickup element 11 reads the image of the manuscript Ma (shown in FIG. 1) such as sentences and drawings. As the image pickup element 11, a CCD image sensor or a CMOS image sensor may be applied. The image pickup element 11 of the first embodiment has a plate-like shape (thin rectangular parallelepiped shape) extending along a surface parallel to the imaging surface 11a. The imaging surface 11a has a rectangular plane shape. Hereinafter, Dl denotes the longitudinal direction of the image pickup element 11, Dt denotes the thickness direction orthogonal to the imaging surface 11a, and Ds denotes the short direction orthogonal to the longitudinal direction Dl and the thickness direction Dt. Here, a surface of the image pickup element 11 opposite to the imaging surface 11a is fixed to the circuit board 12.

The circuit board 12 includes a circuit and an element to drive the image pickup element (i.e., to acquire the image information and to output the acquired image information), a connector to supply the power to the image pickup element 11, and the like. The circuit board 12 has a plate-like shape with a rectangular surface larger than the image pickup element 11. The image pickup element 11 is fixed to the circuit board 12 with a fixing member 14.

The translucent member 13 is attached to the image pickup element 11 so as to cover the imaging surface 11a. The translucent member 13 is to prevent dust from entering into the image pickup element 11, thereby preventing deterioration in the performance for reading the image information. The translucent member 13 has a plate-like shape and is formed by a member having a light emitting property. In the first embodiment, a glass plate having a rectangular shape is used as the translucent member 13.

Figure 6:
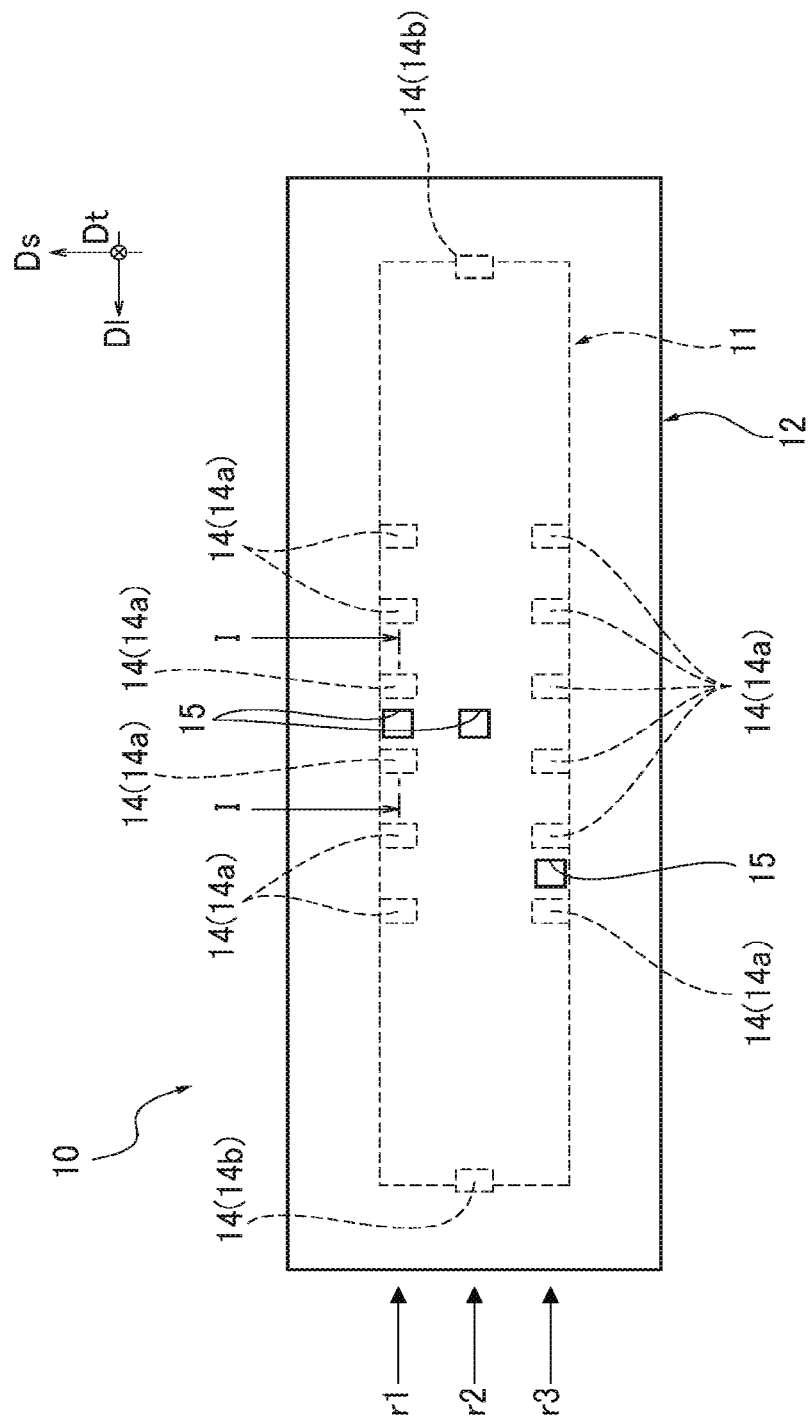
FIG. 6 is an explanatory view of the example of the imaging unit, seen from a circuit board side, having through holes on the circuit board of the first embodiment according to the present invention.
Figure 7:
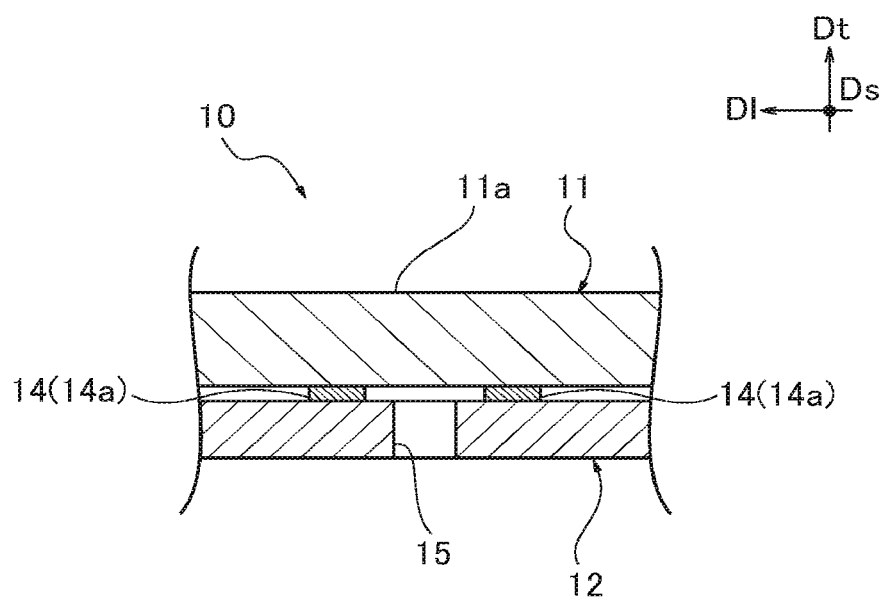
FIG. 7 is a sectional view taken along a line I-I of FIG. 6 for explaining a configuration of the circuit board (imaging unit) having the through holes.

The fixing member 14 fixes the image pickup element 11 onto the circuit board 12 with an adhesive, soldering, a screw, or the like. For instance, in the first embodiment, solder bumps are provided at electrodes on the surface opposite to the imaging surface 11a of the pickup element 11, and the fixing member 14 is formed by melting each of the solder bumps. Note that the shapes and sizes of the solder bumps are substantially identical to each other. As illustrated in FIG. 6, in the first embodiment, six fixing members 14 are provided along each long-side edge part of the image pickup element 11 and one fixing member 14 is provided on each short-side edge part of the image pickup element 11. The six fixing members 14 are arranged symmetrically to the center on each long-side edge part. In this disclosure, the fixing members 14 provided on the long-side edge parts of the image pickup element 11 are also denoted by fixing members 14a, and the fixing members 14 provided on the short-side edge parts thereof are also denoted by fixing members 14b. In the first example, each of the fixing members 14a electrically connects the image pickup element 11 to the circuit board 12 (specifically, to the circuit printed on the circuit board) and fixes the image pickup element 11 to the circuit board 12. Here, the fixing members 14a are also referred to as connecting pins. On the other hand, each of the fixing members 14b of the first embodiment does not have a function to electrically connect the image pickup element 11 to the circuit board but supplementarily fixes the element 11 to the circuit board 12. The fixing members 14b are, therefore, also referred to as extra pins.

As illustrated in FIG. 6, the six fixing members 14a provided on the upper side of the image pickup element 11 are aligned on a straight line extending in the longitudinal direction Dl (i.e., the positions of the fixing members 14a in the short direction Ds are the same). The straight line is referred to as a first row r1. The fixing members 14b are aligned on a straight line extending in the longitudinal direction Dl, and this straight line is referred to as a second row r2. The six fixing members 14a provided on the lower side of the image pickup element 11 are aligned on a straight line extending in the longitudinal direction Dl, and this straight line is referred to as a third row r3.

The imaging unit 10 has through holes 15 (illustrated in FIGS. 6 and 7) on the circuit board 12. As illustrated in FIG. 15, the through holes 15 are formed by penetrating the circuit board 12 in the thickness direction Dt. As illustrated in FIG. 6, each of the through holes 15 has a rectangular shape and has substantially the same size. Here, the size (dimension) of the through holes 15 is smaller than that of the fixing members 14. In the first embodiment, one through hole 15 is provided at a position between the two central fixing members 14a on the first row r1, one through hole 15 is provided in the middle of the two fixing members 14b on the second row r2, and one through hole 15 at a position between the two fixing members 14a on the third row r3 placed on the left side of the circuit board 12. That is, the imaging unit 10 of the first embodiment has one through hole 15 on each straight line (on each row r1, r2, r3) extending in the longitudinal direction Dl. Besides, each of the through holes 15 of the imaging unit 10 according to the first embodiment is provided at a position between two fixing members 14 on each straight line (on each row r1, r2, r3). By having the above dimension for the though-holes 15, the circuit board 12 forms a predetermined space between each through hole 15 and the corresponding fixing members 14.

Since the linear expansion coefficient of the image pickup element 11 differs from the linear expansion coefficient of the circuit board 12, the expansion amount of the image pickup element 11 differs from the expansion amount of the circuit board 12. When the expansion amount (linear expansion coefficient) of the image pickup element 11 is smaller than the expansion amount (linear expansion coefficient) of the circuit board 12, the image pickup element 11 receives stress and may be deformed by the stress. As a result, the imaging surface 11a of the imaging unit 10 may be deformed, and therefore, the distances from the imaging forming lens to the center of the imaging surface 11a and to the edges of the imaging surface 11a may change. Namely, the optical length of the imaging unit 10 may change, resulting in deterioration in the optical performance of the imaging unit 10. To prevent or suppress such deformation, the imaging unit 10 of the first embodiment of this disclosure includes the through holes 15 (illustrated in FIGS. 5 and 6). The actions and the effects will be described with reference to FIGS. 9 to 25.

Figure 9:
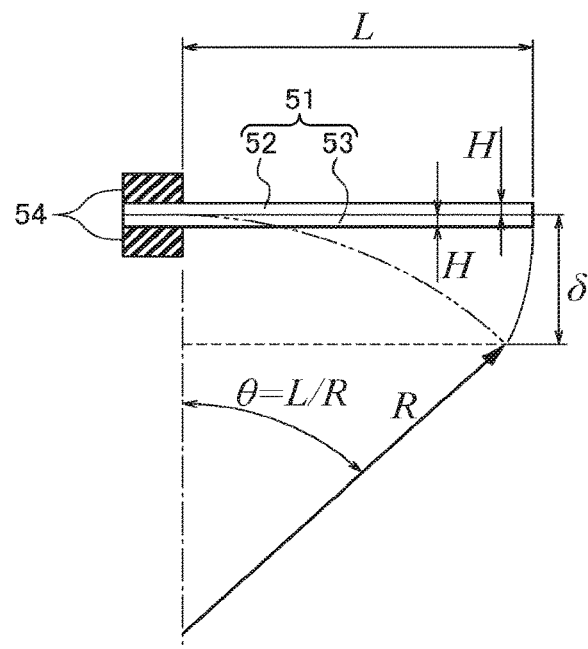
FIG. 9 is an explanatory view illustrating a test piece formed by adhering a first plate-like member and a second plate-like member.

FIG. 9 shows a test piece 51 including a first plate-like member 52 and a second plate-like member 53. The first plate-like member 52 and the second plate-like member 53 are fixed to each other and have different linear expansion coefficients from each other. The first plate-like member 52 and the second plate-like member 53 have the same length, width, and thickness and are adhered to form the test piece 51. The test piece 51 is fixed to and supported by a supporting member 54 at one end. Here, L denotes the length of the first and second plate-like members 52, 53, H denotes the thickness of them, and T denotes a temperature difference (change amount in temperature). For the first plate-like member 52, the linear expansion coefficient is $\alpha_1$ and the Young's modulus is $E_1$. For the second plate-like member 53, the linear expansion coefficient is $\alpha_2$ and the Young's modulus is $E_2$. By assuming a deformation amount at the one end of the test piece 51 fixed to the supporting member 54 is negligibly small, the deformation of the test piece 51 is expressed with a curvature radius R and its central angle θ. Specifically, the deformation amount δ is obtained by the following equation (1):

$$\delta = R(1 - \cos\theta) \approx \frac{L^2(\alpha_1 - \alpha_2)T}{H} \times \frac{6E_1 E_2}{(E_1 + E_2)^2 + 12E_1 E_2} \quad (1)$$

By replacing $E_1/E_2$ in the equation (1) with a ratio of Young's modulus E', the equation (1) is expressed by the following equation (2):

$$\delta = A \frac{E'}{E'^2 + 14E' + 1}, \quad (2)$$

where A represents the constant value, $[6 \times L2 \times (\alpha_1 - \alpha_2) \times T]/H$, in the equation (1).

In the equation (2), the deformation amount δ is expressed with the ratio E' of the Young's modulus $E_1$ of the first plate-like member 52 and the Young's modulus $E_2$ of the second plate-like member 53. Accordingly, the relationship between the ratio of Young's modulus E' and the deformation amount δ is shown in FIG. 10. As shown in FIG. 10, when the ratio E' is 1 (i.e., when the Young's modulus $E_1$ and the Young's modulus $E_2$ are identical to each other), the deformation amount δ of the test piece 51 becomes maximum. Further, as shown in FIG. 10, the smaller the ratio E' or the greater the ratio E' (i.e., the greater the difference between the Young's modulus $E_1$ and the Young's modulus $E_2$), the smaller the deformation amount δ achieved.

Here, the test piece 51 will be replaced with the image pickup element 11 and the circuit board 12 of the imaging unit 10. As an example, if the image pickup element 11 is made from a ceramic material (e.g., an alumina), the Young's modulus of the element 11 is 400 GPa. The circuit board 12 generally has the Young's modulus of 20 GPa to 40 GPa. The circuit board 12 of the imaging unit 10 corresponds to the first plate-like member 52, and the image pickup element 11 corresponds to the second plate-like member 53. Hence, the ratio of the Young's modulus E' becomes 1/10 to 1/20. That is, the deformation amount δ will be within the ellipse indicated by a dotted chain line in FIG. 10. When the Young's modulus of the image pickup element 11 (the second plate-like member 53) is constant, the ratio E' of the imaging unit 10 is decreased by decreasing the Young's modulus of the circuit board 12 (the first plate-like member 52). As a result, the deformation amount δ is reduced. Note that although the Young's modulus changes in accordance with the thickness and/or shapes of the members, the Young's modulus of the image pickup element 11 is greater than that of the circuit board 12 in most cases. Further, even if the Young's modulus of the image pickup element 11 is smaller than that of the circuit board 12, it only changes the direction of the deformation and does not change the above-described relationship.

In the imaging unit 10 of this embodiment, the Young's modulus of the circuit board 12 is decreased (i.e., the rigidity of the circuit board 12 is decreased) by having the through holes 15 on the circuit board 12 such that the deformation of the circuit board 12 and the image pickup element 11 is reduced. In general, circuit boards, however, have signal lines (electric wires) on the surface or the inside thereof to configure a circuit. That is, having through holes reduces an area enable to have the signal lines (electric wires). Therefore, the positions, sizes, and the number of the through holes 15 on the circuit board 12 should be defined to efficiently reduce the deformation amount of the image pickup element 11 while minimizing the area for the through holes 15.

The inventors carried out following first to fifth verifications using simulation software to analyze the differences of the deformation amounts δ of the image pickup element 11 by changing the positions, sizes, and the number of the through holes 15 on the circuit board 12. In this disclosure, the positions, sizes, and the number of the through holes 15 on the circuit board 12 are determined based on the verification results. Note that the temperature changes in the simulations for the verifications are set in accordance with the heat generated by the electric elements installed to the circuit board 12, the heat generated by the devices provided in the vicinity of the imaging unit 10, and the like. As illustrated in FIGS. 11, 13, 16, 18, and 21A to 21E, in the first to fifth verifications, eight fixing members 14a are provided in the first row r1, two fixing members 14b are provided on the second row r2, and eight fixing members 14a are provided on the third row r3 to fix the image pickup element 11 to the circuit board 12. The fixing members 14a on the first row r1 and the fixing members 14a on the third row r3 are linearly aligned in the longitudinal direction Dl respectively, and the fixing members 14a on the first row r1 and the corresponding fixing members 14a on the third row r3 are aligned in the short direction Ds. In the first to fifth verifications, candidate positions P for the through holes have been defined on the circuit board 12, and the through holes 15 that comply with the candidate positions P will be provided on the circuit board 12.

Figure 11:
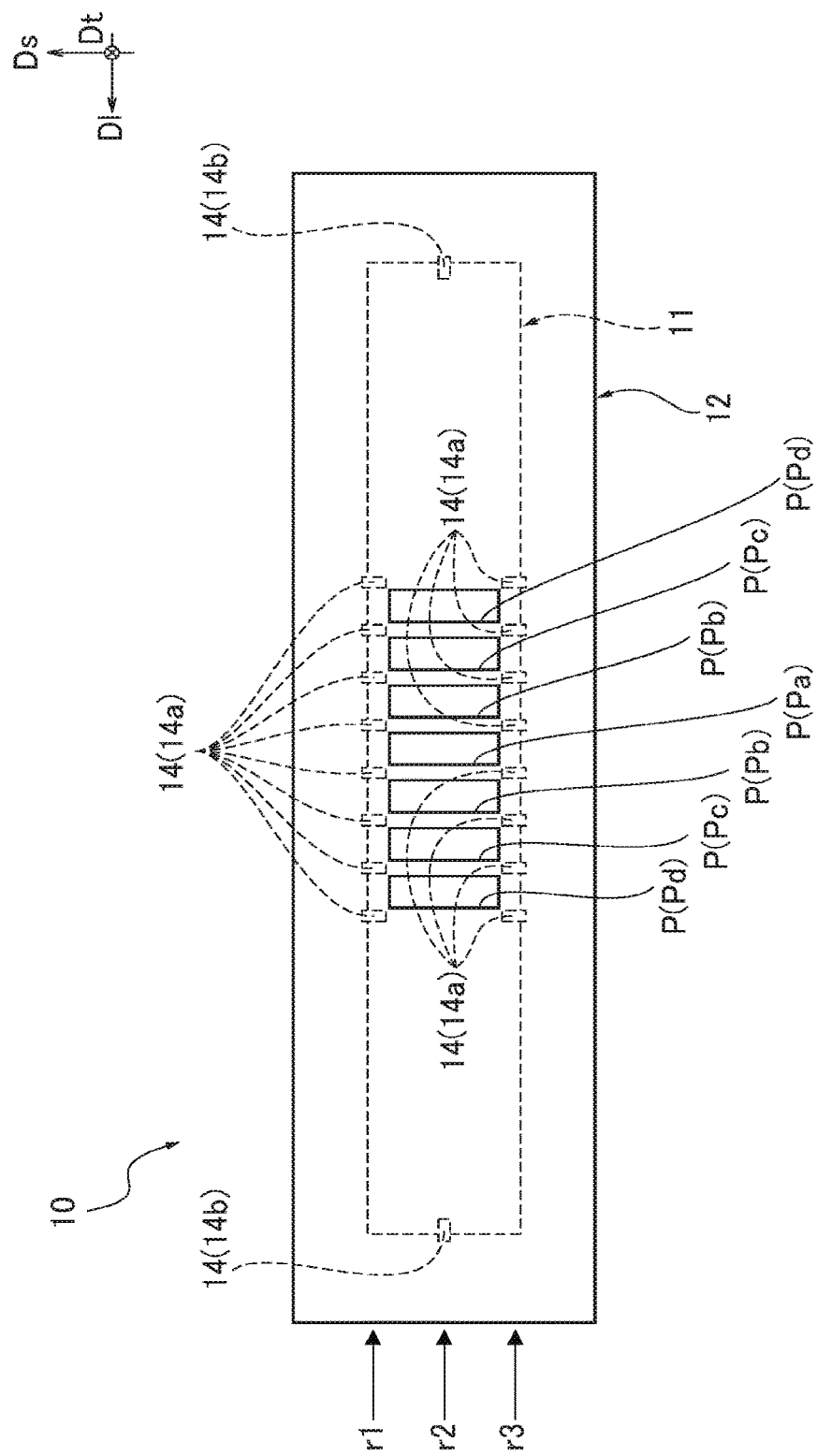
FIG. 11 is an explanatory view similar to FIG. 6, but illustrating candidate positions P1 for the through hole on the circuit board in a first verification.

As illustrated in FIG. 11, in the first verification, seven of candidate positions P for the through holes 15 are determined to be in the middles of each fixing member 14a. In the first verification, the sizes (dimensions) of the through holes 15 (i.e., the candidate positions P) are determined such that the through holes 15 are provided at positions between the fixing members 14a in the short direction Ds and between the fixing members 14b in the longitudinal direction Dl. As a result, the candidate positions P (through holes 15) of the first verification are aligned along the second row r2 and are not overlapped with the fixing members 14a in the short direction Ds.

In the first verification, the deformation amounts δ of the image pickup element 11 (circuit board 12) are calculated by the simulation software under the following four patterns. In the first pattern, only one through hole 15 is provided at the candidate position Pa at the center of the seven positions. In the second pattern, two more through holes 15 are provided at the candidate positions Pb next to the candidate position Pa. In the third pattern, two more through holes 15 are further provided at the candidate positions Pc next to the corresponding candidate positions Pb. In the fourth pattern, two more through holes 15 are further provided at the candidate positions Pd next to the corresponding candidate positions Pc. Namely, the first pattern has one through hole 15, the second pattern has three through holes 15, the third pattern has five through holes 15, and the fourth pattern has seven through holes 15 on the circuit board 12. In other words, in the first verification, the number of the through holes 15 on the circuit board 12 are odd numbers from one to seven, and are increased by two from the center to the outside of the image pickup element 11 (circuit board 12). The simulation software calculates the differences in the deformation amounts δ among these patterns.

Figure 12:
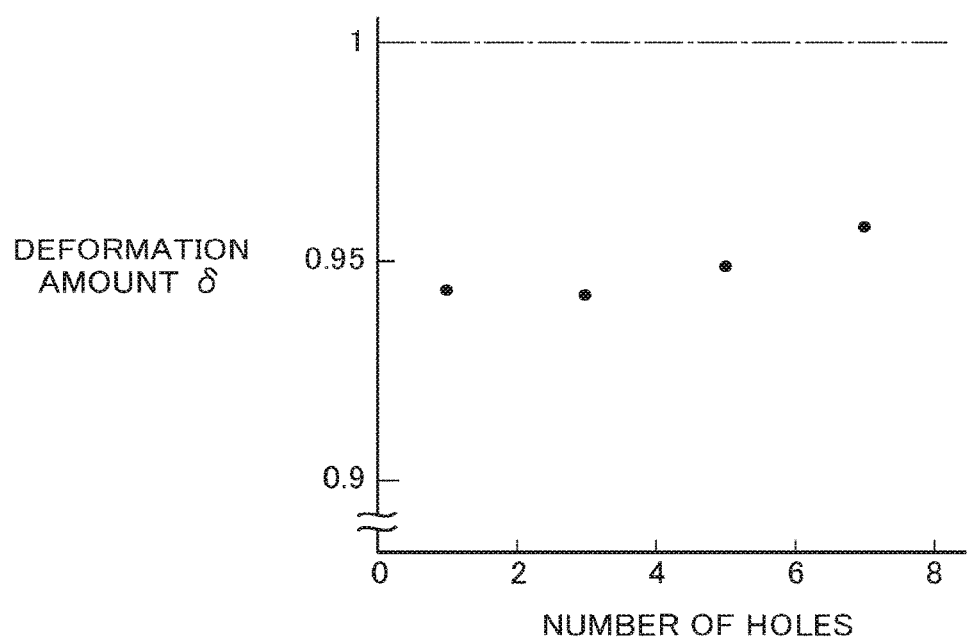
FIG. 12 is a graph showing a deformation of the image pickup element in the first verification where the ordinate denotes a deformation amount δ and the abscissa denotes the number of the holes.

In the first verification, by calculating the deformation amount δ of the image pickup element 11 (circuit board 12) for each pattern, the differences in the deformation amount δ with respect to the differences of the number of the through holes 15 are obtained as shown in FIG. 12. FIG. 12 shows the deformation amounts δ that are standardized with a deformation amount of the image pickup element 11 (circuit board 12) without a through hole 15. As shown in FIG. 12, regardless of the number of the through holes 15, the deformation amount δ is reduced. Also, the results show that increasing the number of the through holes 15 does not significantly change the deformation amounts δ.

Figure 13:
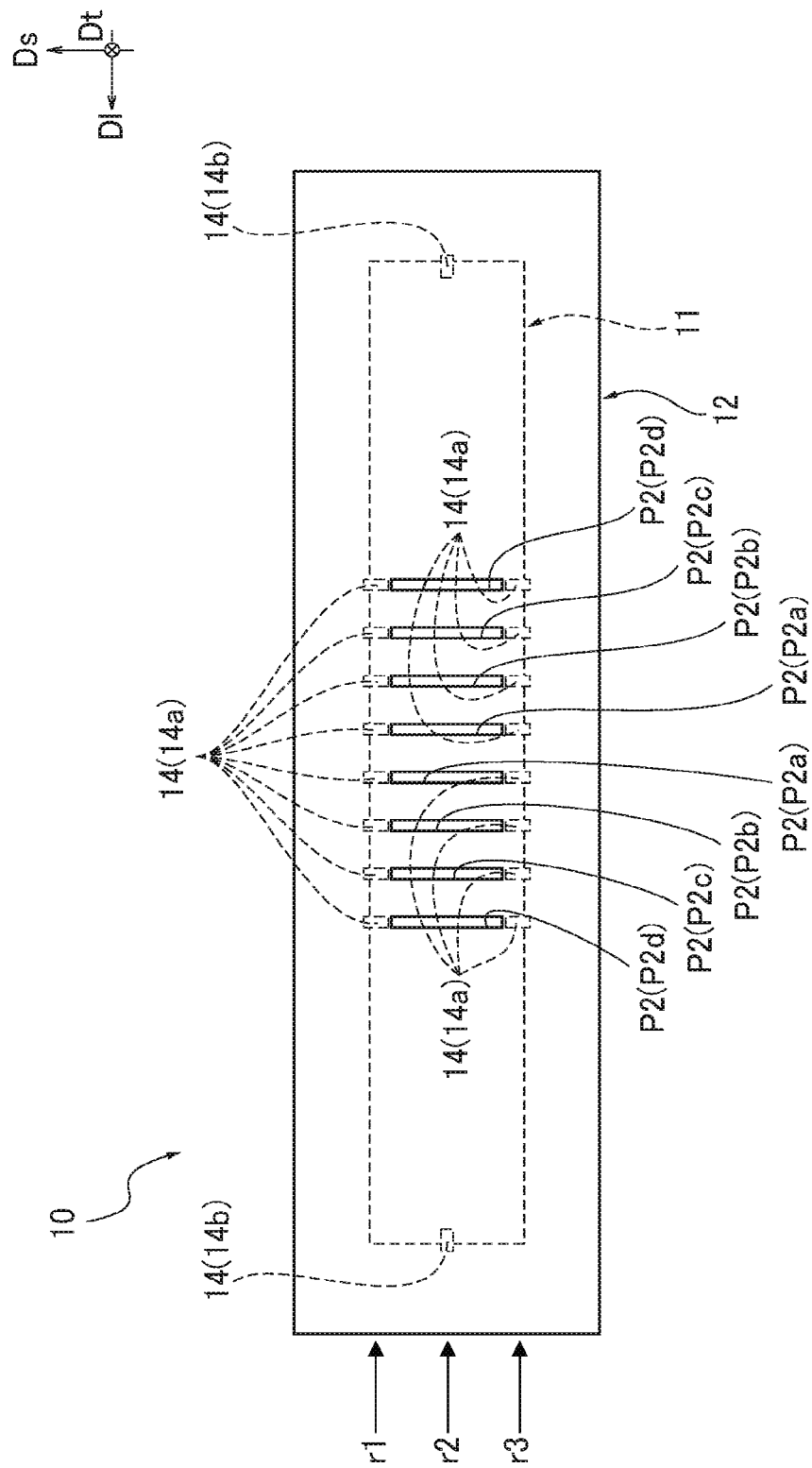
FIG. 13 is an explanatory view similar to FIG. 6, but illustrating candidate positions P2 for the through hole on the circuit board in a second verification.

As illustrated in FIG. 13, in the second verification, eight of candidate positions P2 for the through holes 15 are determined to be the positions corresponding to the fixing members 14a. In the second verification, the length (dimensions) of the candidate positions P2 (i.e., through holes 15) in the longitudinal direction Dl is the same as that of the fixing members 14a, and the through holes 15 are provided at positions between the fixing members 14a in the short direction Ds. As a result, the candidate positions P2 (through holes 15) of the second verification are aligned along the second row r2 and are overlapped with the corresponding fixing members 14a in the short direction Ds.

In the second verification, the deformation amounts δ of the image pickup element 11 (circuit board 12) are calculated by the simulation software under the following four patterns. In the first pattern, two through holes 15 are provided at the candidate positions P2a at the center of the eight positions. In the second pattern, two more through holes 15 are provided at the candidate positions P2b next to the corresponding candidate positions P2a. In the third pattern, two more through holes 15 are further provided at the candidate positions P2c next to the corresponding candidate positions P2b. In the fourth pattern, two more through holes 15 are further provided at the candidate positions P2d next to the corresponding candidate positions P2c. Namely, the first pattern has two through holes 15, the second pattern has four through holes 15, the third pattern has six through holes 15, and the fourth pattern has eight through holes 15 on the circuit board 12. In other words, in the second verification, the numbers of the through holes 15 on the circuit board 12 are even numbers from two to eight, and are increased from the center to the outside of the image pickup element 11 (circuit board 12). The simulation software calculates the differences in the deformation amounts δ among these patterns.

Figure 14:
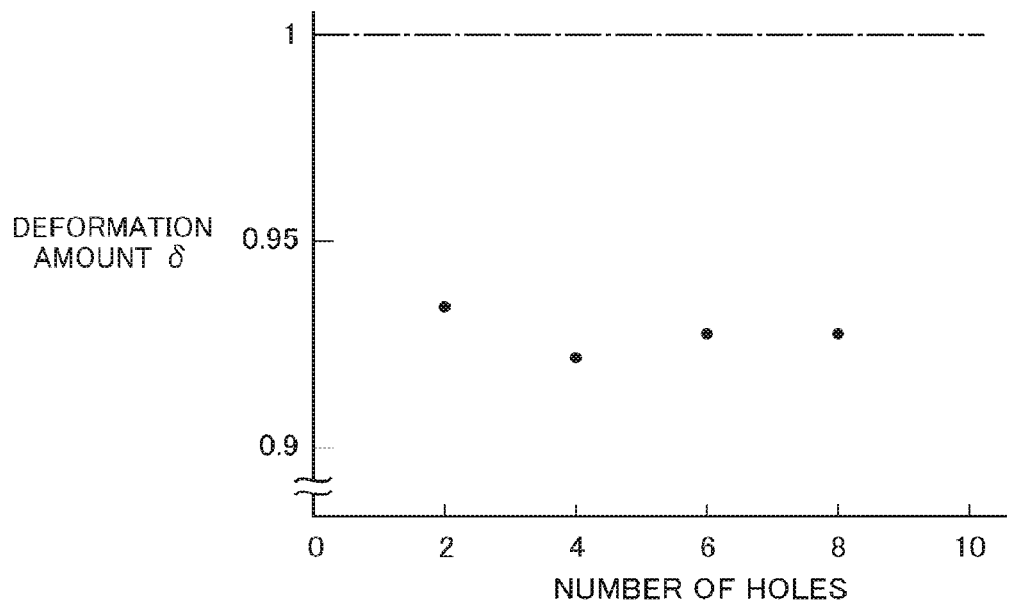
FIG. 14 is a graph showing a deformation of the image pickup element in the second verification where the ordinate denotes a deformation amount δ and the abscissa denotes the number of the holes.
Figure 15:
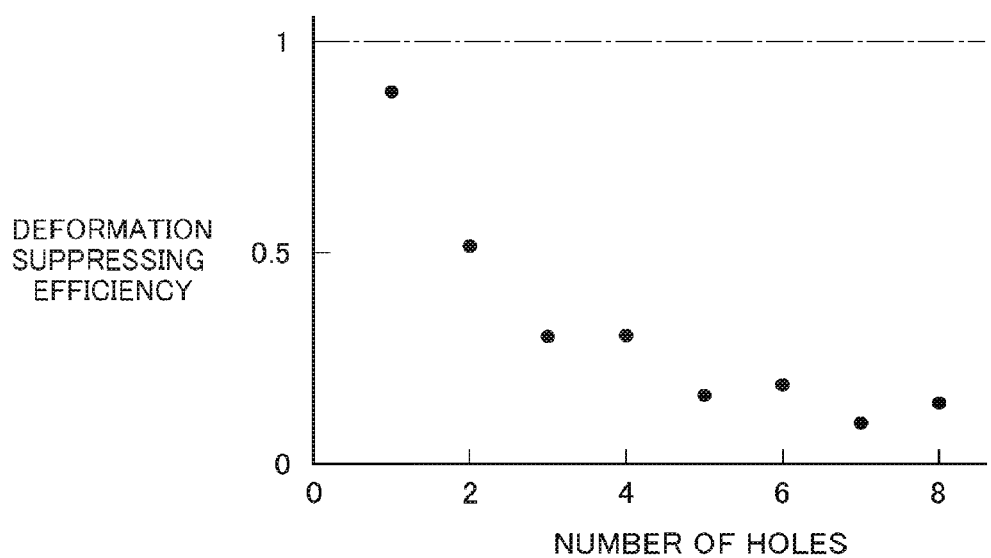
FIG. 15 is a graph showing a result of a deformation suppressing efficiency obtained from the first and second verifications where the ordinate denotes the deformation suppressing efficiency and the abscissa denotes the number of the holes.

In the second verification, by calculating the deformation amount δ of the image pickup element 11 (circuit board 12) for each pattern, the differences in the deformation amount δ with respect to the differences of the number of the through holes 15 are obtained as shown in FIG. 14. FIG. 14 shows the deformation amounts δ that are standardized with a deformation amount of the image pickup element 11 (circuit board 12) without a through hole 15. As shown in FIG. 14, regardless of the number of the through holes 15, the deformation amount δ is reduced by providing the through hole 15. Also, the results show that increasing the number of the through holes 15 does not significantly change the deformation amounts δ.

Here, deformation suppressing efficiencies in the first verification and the second verification are calculated. First, the deformation amount δ of the image pickup element 11 (circuit board 12) in each pattern is subtracted from the deformation amount δ without a through hole 15, i.e., a reduction amount in the deformation is obtained for each pattern. Next, the opening area of the through holes 15 on the circuit board is calculated for each pattern. By calculating the ratio of the reduction amount in the deformation related to the corresponding opening area for each pattern, the deformation suppressing efficiency is determined for each pattern. Through the above calculations, the deformation suppressing efficiencies with respect to the number of the through holes 15 are obtained as shown in FIG. 15. As clearly shown in FIG. 15, the less the through holes 15, the better the deformation suppressing efficiency achieved. Consequently, the first and second verifications show that the deformation amount δ is reduced by providing a through hole 15, and that the less the through holes 15, the better the deformation suppressing efficiency achieved.

Figure 16:
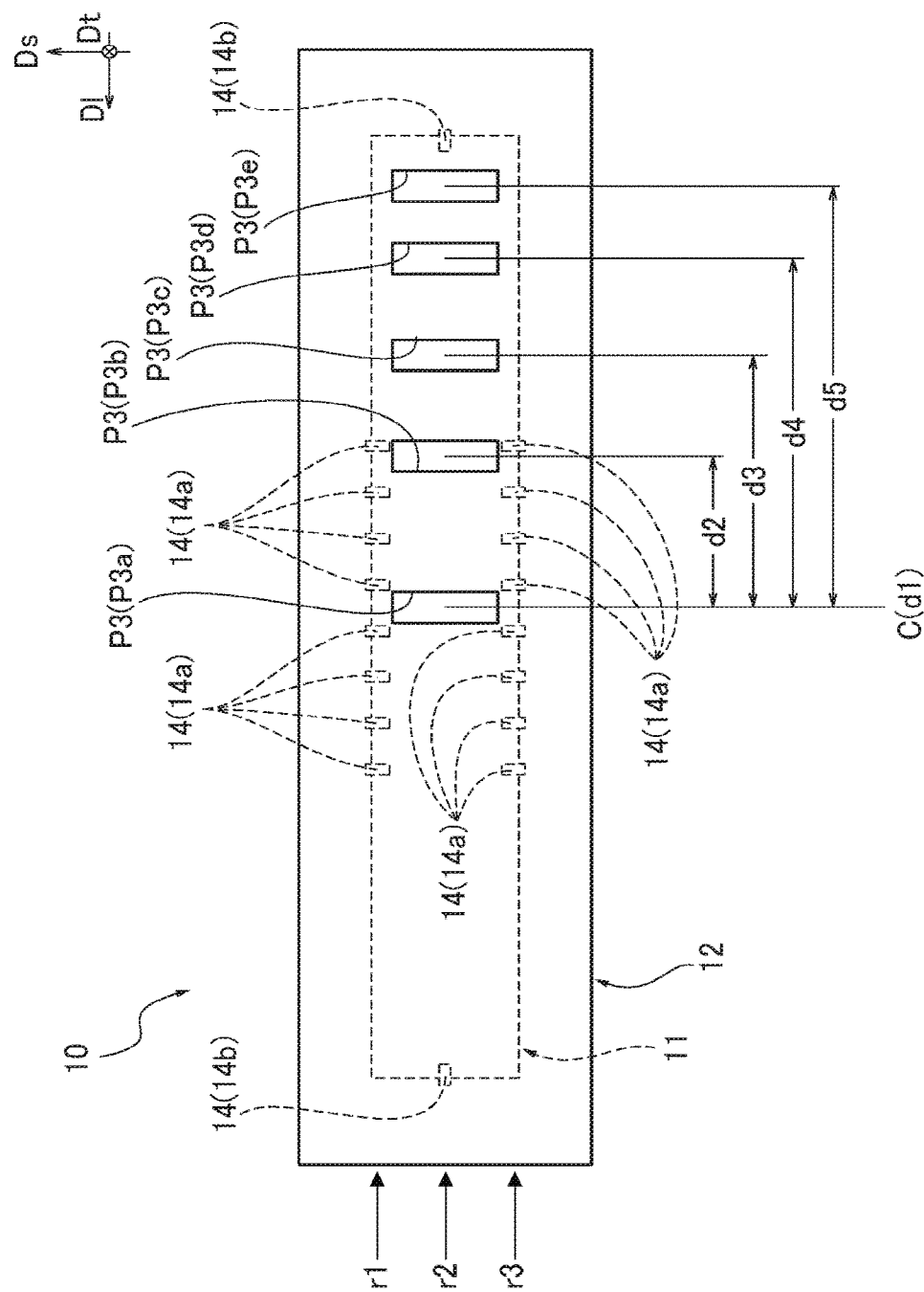
FIG. 16 is an explanatory view similar to FIG. 6, but illustrating candidate positions P3 for the through hole on the circuit board in a third verification.

As illustrated in FIG. 16, in the third verification, five of candidate positions P3 for the through holes 15 are determined. The five candidate positions P3 are aligned in the longitudinal direction Dl from the center position C to the outside of the circuit board 12. The candidate positions P3 (through holes 15) have the same dimension (size) as the candidate positions P in the first verification (see FIG. 11). That is, the candidate positions P3 (through holes 15) of the third verification are aligned on the second row r2 and are not overlapped with the fixing members 14a in the longitudinal direction Dl.

The first candidate position P3a is located at a position separated by a first predetermined distance d1 from the center position C in the longitudinal direction. In this example, the distance d1 is determined such that the center of the first candidate position P3a is located at the center position C of the circuit board. The second candidate position P3b is located at a position separated by a second predetermined distance d2 from the center position C in the longitudinal direction. Note that the second predetermined distance d2 is determined such that the end part of the second candidate position P3b is located at a position between the outermost fixing members 14a in the longitudinal direction Dl.

The third candidate position P3c is located at a position separated by a third predetermined distance d3 from the center position C in the longitudinal direction Dl, and the fourth candidate position P3d is located at a position separated by a fourth predetermined distance d4 from the center position C. The predetermined distances d3 and d4 (i.e., the third and fourth candidate positions P3c and P3d) are determined such that a shortest distance q (explained later with reference to FIG. 24) from the fixing members 14 becomes longer than a half of a length Q (explained later with reference to FIG. 24) of the image pickup element 11 in the short direction Ds. The fifth candidate position P3e is located at a position separated by a fifth predetermined distance d5 from the center position C in the longitudinal direction Dl. The predetermined distance d5 (i.e., the fifth candidate position P3e) is determined such that the shortest distance q from the fixing member 14b located on the right-side of the image pickup element 11 becomes shorter than a half of the length Q of the image pickup element 11 in the short direction Ds.

In the third verification, the deformation amounts δ of the image pickup element 11 (circuit board 12) are calculated by the simulation software under the following five patterns. In the first pattern, one through hole 15 is provided at the candidate position P3a. In the second pattern, one through hole 15 is provided at the candidate position P3b. In the third pattern, one through hole 15 is provided at the candidate position P3c. In the fourth pattern, one through hole 15 is provided at the candidate position P3d. In the fifth pattern, one through hole 15 is provided at the candidate position P3e. Namely, each of the first to fifth patterns has only one through hole 15 on the circuit board 12. In other words, in the third verification, the deformation amounts δ are calculated as changing the position of the through hole 15 from the center position C of the circuit board 12 (eight pairs of the fixing members 14a) toward the outside of the circuit board 12 in the longitudinal direction Dl.

Figure 17:
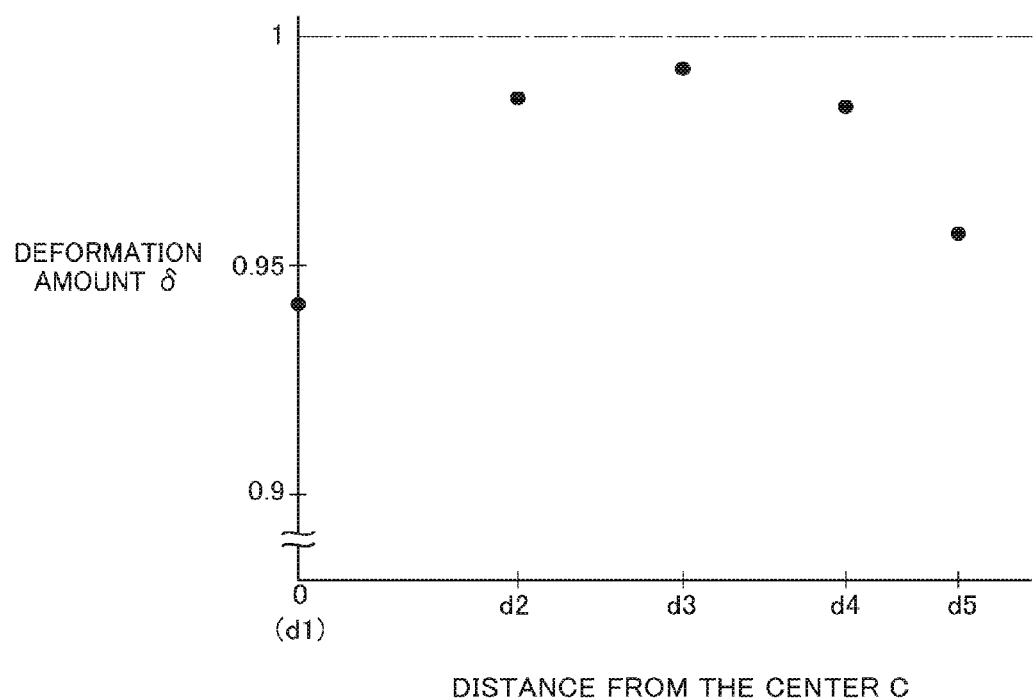
FIG. 17 is a graph showing a deformation of the image pickup element in the third verification where the ordinate denotes a deformation amount δ and the abscissa denotes a distance from the center position C.

In the third verification, by calculating the deformation amount δ of the image pickup element 11 (circuit board 12) for each pattern, the differences in the deformation amount δ with respect to the differences of the positions of the through hole 15 are obtained as shown in FIG. 17. FIG. 17 shows the deformation amounts δ that are standardized with a deformation amount of the image pickup element 11 (circuit board 12) without a through hole 15. As shown in FIG. 17, regardless of the position of the through hole 15, the deformation amount δ is reduced by providing the through hole 15. Also, the results show that the deformation amount δ becomes the smallest when the through hole 15 is provided at the candidate position P3a, and the deformation amount δ is also relatively small when the through hole 15 is provided at the candidate position P3e. Additionally, FIG. 17 shows the deformation amount δ becomes largest when the through hole 15 is provided at the candidate position P3c, i.e., the position the farthest from the fixing members 14 (fixing members 14a and 14b). Consequently, the third verification shows that the deformation amount δ becomes less as the through hole 15 is provided closer to the fixing members 14. On the other hand, the deformation amount δ becomes greater as the through hole 15 is provided farther from the fixing members 14.

Figure 18:
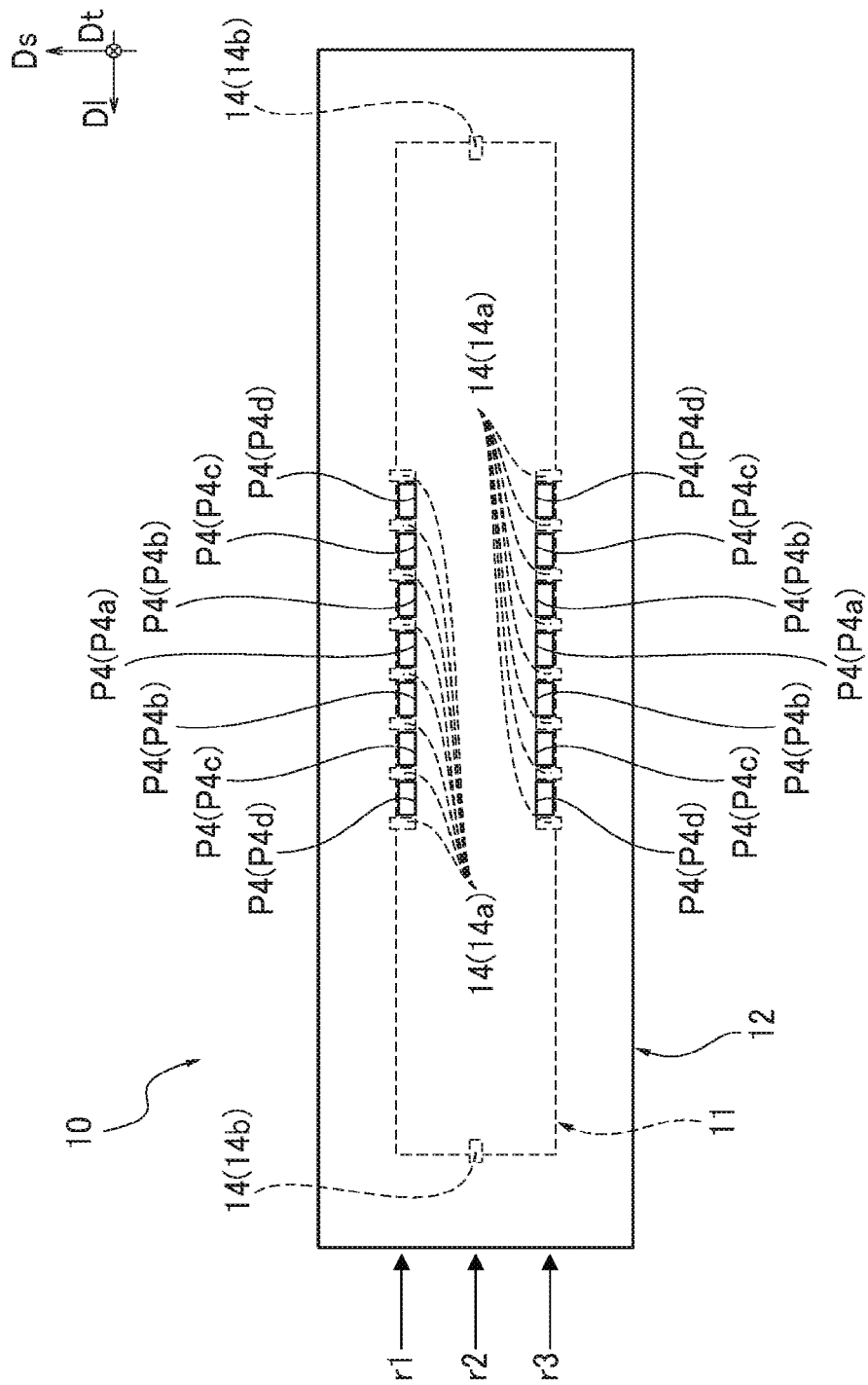
FIG. 18 is an explanatory view similar to FIG. 6, but illustrating candidate positions P4 for the through hole on the circuit board in a fourth verification.

As illustrated in FIG. 18, in the fourth verification, seven of candidate positions P4 for the through holes 15 are determined to be in the middles of each of the eight fixing members 14a on each of the first row r1 and on the third row r3. In the fourth verification, the length (dimension) of the candidate positions P4 (i.e., through holes 15) in the longitudinal direction Dl is the same as that of the clearance between the each of the fixing members 14a, and the width (dimension) of the candidate positions P4 (i.e., through hole 15) in the short direction Ds is the same as that of the fixing members 14b. As a result, the candidate positions P4 (through holes 15) of the fourth verification are aligned along the first row r1 and the third row r3 and are not overlapped with the fixing members 14a in the longitudinal direction Dl.

In the fourth verification, the deformation amounts δ of the image pickup element 11 (circuit board 12) are calculated by the simulation software under the following four patterns. In the first pattern, one through hole 15 is provided at the candidate position P4a at the center of the seven positions on each of the first and third rows r1, r3. In the second pattern, two more through holes 15 are further provided at the candidate positions P4b next to the corresponding candidate position P4a on each of the first and third rows r1, r3. In the third pattern, two more through holes 15 are further provided at the candidate positions P4c next to the corresponding candidate positions P4b on each of the first and third rows r1, r3. In the fourth pattern, two more through holes 15 are further provided at the candidate positions P4d next to the corresponding candidate positions P4c on each of the first and third rows r1, r3. Namely, the first pattern has one through hole 15, the second pattern has three through holes 15, the third pattern has five through holes 15, and the fourth pattern has seven through holes 15 on the circuit board 12. In other words, in the fourth verification, the numbers of the through holes 15 on the circuit board 12 are odd numbers from one to seven, and are increased from the center to the outside of the image pickup element 11 (circuit board 12) on the first and third rows r1, r3. The simulation software calculates the differences in the deformation amounts δ among these patterns.

Figure 19:
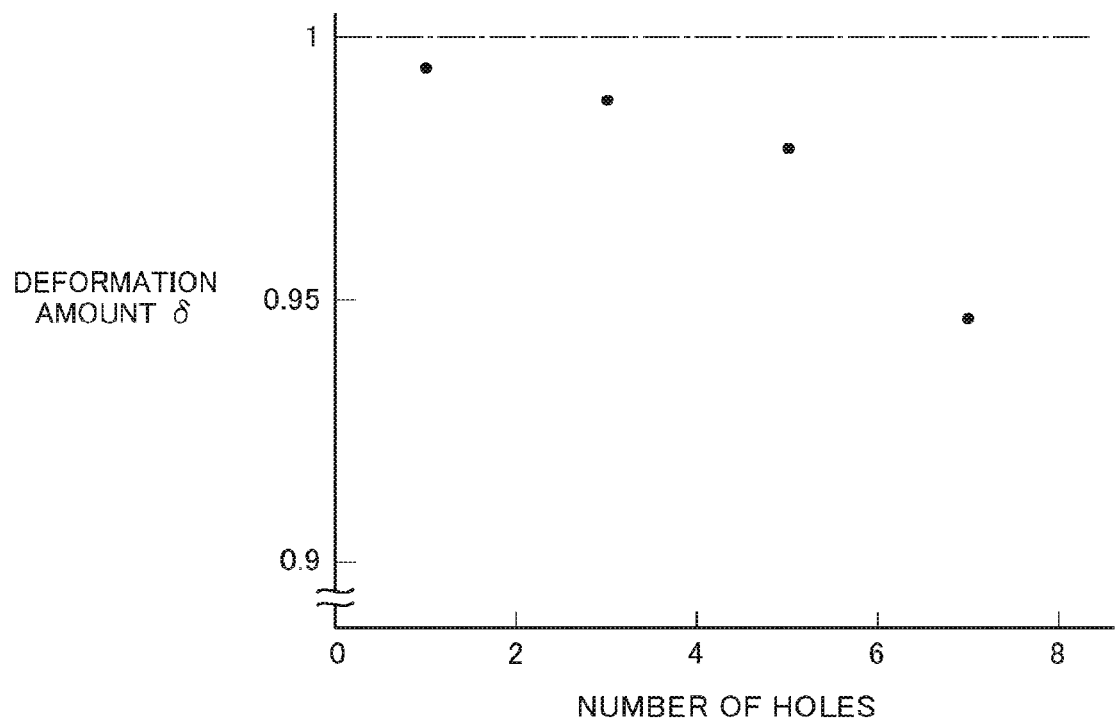
FIG. 19 is a graph showing a deformation of the image pickup element in the fourth verification where the ordinate denotes a deformation amount δ and the abscissa denotes the number of the holes.
Figure 20:
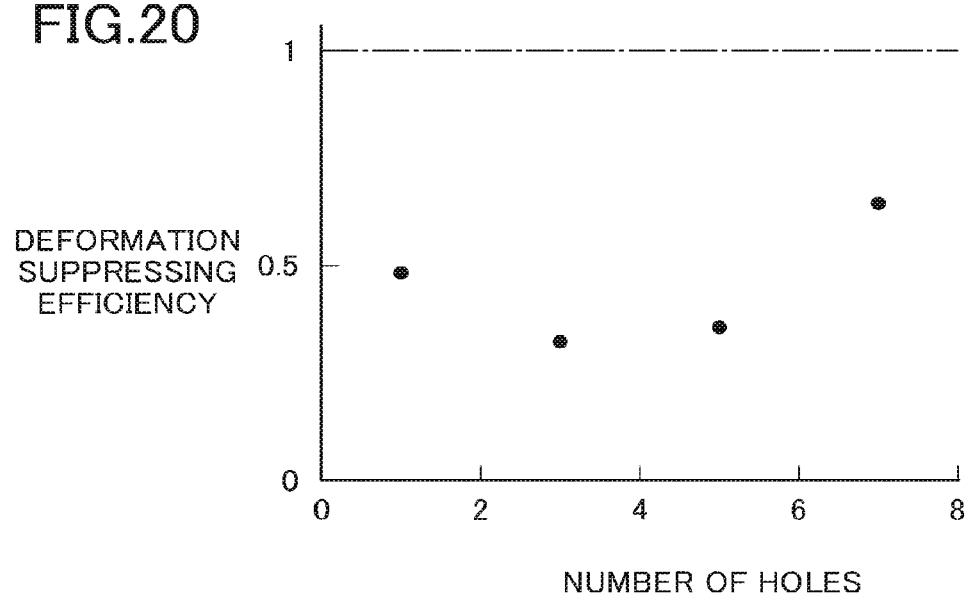
FIG. 20 is a graph showing a result of a deformation suppressing efficiency obtained from the fourth verification where the ordinate denotes the deformation suppressing efficiency and the abscissa denotes the number of the holes.

In the fourth verification, by calculating the deformation amount δ of the image pickup element 11 (circuit board 12) for each pattern, the differences in the deformation amount δ with respect to the differences of the number of the through holes 15 are obtained as shown in FIG. 19. FIG. 19 shows the deformation amounts δ that are standardized with a deformation amount of the image pickup element 11 (circuit board 12) without a through hole 15. As shown in FIG. 19, regardless of the number of the through holes 15, the deformation amount δ is reduced by providing the through hole 15. Also, the results of FIG. 19 show that the deformation amount δ decreases as the number of the through holes 15 increases. Further, FIG. 19 shows that by having seven through holes 15 in each of the first and third rows r1 and r3 (i.e., by providing the through holes 15 at all of the candidate positions P4), the deformation amount δ in the fourth verification becomes substantially identical to that in the first to third verifications even though the size of the through holes 15 is smaller than those of the first to third verifications.

Here, deformation suppressing efficiencies in the fourth verification are calculated. The calculation method of the deformation suppressing efficiencies (i.e., reduction amounts in the deformation/corresponding opening areas) is the same as that of the first and second verifications. By calculating the deformation suppressing efficiencies of the fourth verification, a relation between the number of the through holes 15 and the deformation suppressing efficiency is obtained, as shown in FIG. 20. FIG. 20 shows that the deformation suppressing efficiency becomes highest when the seven through holes 15 are provided on each of the first and third rows r1, r3 (i.e., the through holes are provided at the all of the candidate positions P4). Also, FIG. 20 shows that the deformation suppressing efficiency becomes high when only one through hole 15 is provided at the center of the fixing members 14a on each of the first and third rows r1, r3. Accordingly, even though the size of the through holes 15 is smaller than those of the first and third verifications, FIG. 20 shows that the deformation amount δ is reduced by providing the through hole 15 at the position between the fixing members 14a. Further, FIG. 20 (i.e., the fourth verification) shows that, by respectively providing the through holes 15 at the positions between all of the fixing members 14a, the deformation amount δ is reduced at a high deformation suppressing efficiency.

As illustrated in FIGS. 21A to 21E, the fifth verification changes the size (dimension) of each through hole 15. In the fifth verification, one through hole 15 is provided at the position between two fixing members 14 located at the center on each of the first and third rows r1, r3 (i.e., the through hole 15 is provided at the position corresponding to the candidate position P4a). That is, the through holes 15 are provided on the first and third rows r1, r3 and are not overlapped with the fixing members 14a in the short direction Ds.

In the fifth verification, the deformation amounts δ of the image pickup element 11 (circuit board 12) are calculated by the simulation software under the following five patterns. As illustrated in FIG. 21A, in the first pattern, the length (dimension) Sl1 of the through hole 15a in the longitudinal direction Dl is the same as that of the clearance between the two of the fixing members 14a, and the width (dimension) Ss1 of the through hole 15a in the short direction Ds is the same as that of the fixing member 14a. As illustrated in FIG. 21B, in the second pattern, the length (dimension) Sl2 of the through hole 15b in the longitudinal direction Dl is 0.75 times greater than that of the through hole 15a, and the width (dimension) of the through hole 15b in the short direction Ds is the same as width Ss1 of the through hole 15a. As illustrated in FIG. 21C, in the third pattern, the length (dimension) Sl3 of the through hole 15c in the longitudinal direction Dl is 0.50 times greater than that of the through hole 15a, and the width (dimension) of the through hole 15c in the short direction Ds is the same as width Ss1 of the through hole 15a.

As illustrated in FIG. 21D, in the fourth pattern, the length (dimension) of the through hole 15d is the same as the length Sl1 of the through hole 15a, and the width (dimension) Ss2 of the through hole 15d in the short direction Ds is 0.67 times greater than that of the through hole 15a. In the fifth pattern, the length (dimension) of the through hole 15e in the longitudinal direction Dl is the same as the length Sl1 of the through hole 15a, and the width (dimension) Ss3 of through hole 15e in the short direction Ds is 1.33 times greater than that of the through hole 15a. That is, in the fifth verification, the dimensions (length and width) of the through holes 15 provided at the center of the image pickup element 11 are differed in the longitudinal direction Dl and the short direction Ds with respect to the dimensions of the fixing members 14a in order to obtain the differences in the deformation amounts δ.

Figure 23:
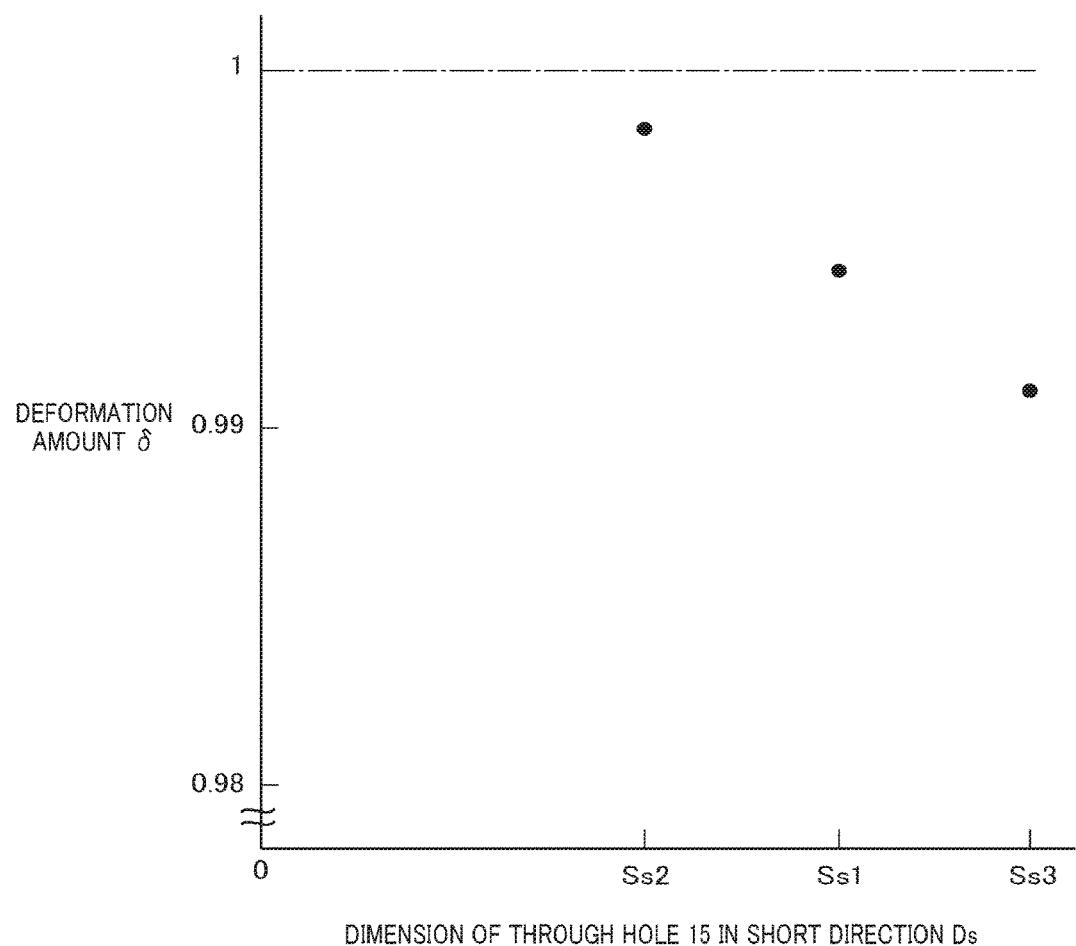
FIG. 23 is a graph showing deformation amounts of the image pickup element measured in the short direction Ds where the ordinate denotes the deformation amount δ and the abscissa denotes the dimension of the through holes in the short direction Dl.

In the fifth verification, by calculating the deformation amounts δ of the image pickup element 11 (circuit board 12) for the first, second, and third patterns, the differences in the deformation amount δ with respect to the differences in the dimension of the through hole 15 in the longitudinal direction Dl are obtained as shown in FIG. 22. Further, by calculating the deformation amounts δ of the image pickup element 11 (circuit board 12) for the first, fourth, and fifth patterns, the differences in the deformation amount δ with respect to the differences in the dimension of the through hole 15 in the short direction Ds are obtained as shown in FIG. 23. FIGS. 22 and 23 show the deformation amounts δ that are standardized with a deformation amount of the image pickup element 11 (circuit board 12) without a through hole 15. That is, FIGS. 22 and 23 show that the deformation amount δ is reduced by providing a through hole 15 regardless of the dimension thereof. As shown in FIG. 22, regardless of the dimension (length) in the longitudinal direction Dl of the through hole 15, the deformation amount δ is reduced by providing the through hole 15. Besides, as shown in FIG. 23, the greater the dimension (width) in the short direction Ds of the through hole 15, the less the deformation amount δ achieved. That is, the fifth verification shows that the deformation amount δ is reduced even if the length (dimension) of the through hole 15 in the longitudinal direction Dl is not as long as the clearance between the corresponding fixing members 14a. Based on the result of the fifth verification, it is understandable that the image pickup element 11 can have a through hole 15 with the signal lines wired around the fixing members 14a while reducing the deformation amount δ.

The imaging units 10 according to the embodiments of this disclosure are designed based on the test piece 51 (illustrated in FIG. 9), in which the first plate-like member 52 and the second plate-like member 53 are superimposed. Therefore, the through holes 15 are provided at positions where the circuit board 12 and the image pickup element 11 are superimposed in the thickness direction Dt. Here, the position of the through hole 15 may be provided such that only a part of the position of the through hole 15 is overlapped with the circuit board 12 and the image pickup element 11.

For the imaging unit 10, it is required to minimize a decrease of the area for wiring the signal lines on the circuit board 12. To achieve it, the imaging units 10 of the embodiments are configured such that the dimension of each of the through holes 15 is similar to the dimension of each of the fixing members 14, which fix the circuit board 12 and image pickup element 11. In particular, the dimension of the through holes 15 is determined such that one through hole 15 is not extended across plural fixing members 14 in the short direction Ds, and also is not extended across plural fixing members 14 in the longitudinal direction Dl. The above-explained through holes 15 in each of the first to fifth verifications are configured to meet these two conditions.

Based on the results of first to fifth verifications, the long image pickup element 11 of the imaging unit 10 includes at least one through hole 15 on a straight line extending in the longitudinal direction Dl, where the plurality of the fixing members is provided. Specifically, the through hole 15 is provided at a position between two fixing members 14 on the line. Note that "on the line" in this disclosure means that at least a part of each through hole 15 overlaps the line. The position, shapes, dimensions, and the number of the through holes 15 are determined such that the deformation amount δ of the image pickup element 11 is reduced while reducing the area (opening area) of the through holes 15 to secure a space for wiring the signal lines.

Figure 24:
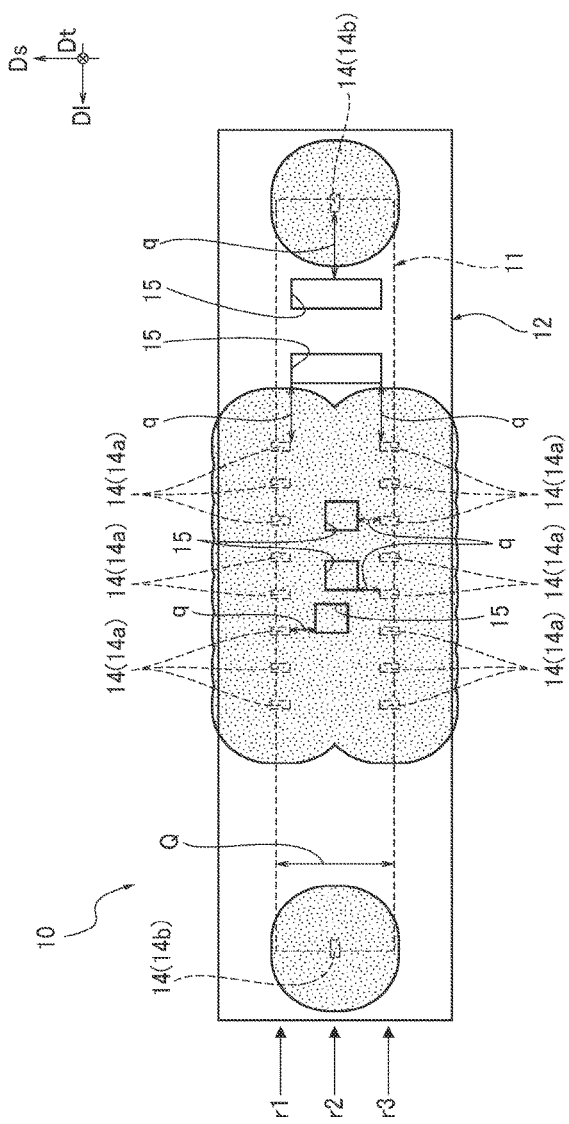
FIG. 24 is an explanatory view similar to FIG. 6, but illustrating an area satisfying a conditional equation (3)

As illustrated in FIG. 24, the positions of the through holes 15 are determined in accordance with the positional relationship of the fixing members 14 (i.e., fixing members 14a and 14b). FIG. 24 shows through holes 15 provided at several positions and having different shapes. FIG. 24 also shows a shortest distance q from each through hole 15 to the closest fixing member 14 (i.e., fixing member 14a or 14b). To be specific, the through holes 15 are provided such that the shortest distance q from each fixing member 14 to the closest through hole 15 becomes shorter than the half of the length (dimension) Q of the image pickup element 11 in the short direction Ds. That is, the positions, shapes, dimensions, and the number of the through holes 15 are determined to satisfy the following conditional equation (3): the shortest distance q<(distance Q/2). A region satisfies the conditional equation (3) is illustrated with dots in FIG. 24. In other words, the through holes 15 are provided such that at least a part of each through hole 15 is positioned in the region illustrated with dots. As described in the third verification, the deformation amount δ becomes less as the through hole 15 is provided closer to the fixing members 14 (i.e., fixing members 14a and 14b); while the deformation amount δ becomes greater as the through hole 15 is provided farther from the fixing members 14. Besides, as described in the fourth verification, the deformation amount δ is reduced at a high deformation suppressing efficiency by providing the through holes 15 at the positions between the fixing members 14a on the first row r1 and the third row r3. Note that the region illustrated in FIG. 24 changes as the shape of the image pickup element 11, the positions and the number of the fixing members 14 changes.

Figure 25:
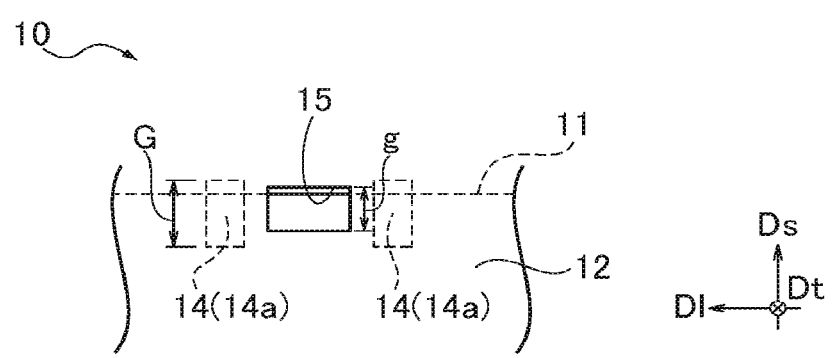
FIG. 25 is an explanatory view similar to FIG. 21, but illustrating dimensions under a conditional equation (4)

As illustrated in FIG. 25, the width (dimension) g of the through hole 15 in the short direction Ds is preferably greater than a half of the width (dimension) G of the fixing members 14 in the short direction Ds. That is, the width (dimension) g of the through holes 15 in the short direction Ds is determined to satisfy a following conditional equation (4): width g>(width G/2). As described in the fifth verification, the greater the dimension (width) of the through holes 15 in the short direction Ds, the less the deformation amount δ achieved. Besides, based on comparison results between the fourth verification and the first to third verifications; the deformation amount δ is efficiently reduced even if the width (dimension) of the through holes 15 in the short direction Ds is substantially the same as that of the fixing members 14, and the deformation amount δ is further reduced by having wider through holes 15.

The width (dimension) g of the through hole 15 in the short direction Ds (illustrated in FIG. 25) is preferably shorter than the half of the distance (dimension) Q in the short direction Ds (illustrated in FIG. 24). To be specific, the width (dimension) g of the through holes 15 in the short direction Ds is determined to satisfy a following conditional equation (5): width g<(distance Q/2). This is because it is common to provide a plurality of fixing members 14 along each long-side edge part (the first row r1 and the third row r3) of the image pickup element 11 and the imaging units 10 of the embodiments are configured to include the through holes 15 at positions between the fixing members 14 on the long-side parts.

As illustrated in FIG. 6, the imaging unit 10 of the first embodiment includes one through hole 15 on the first row r1, on which six fixing members 14a are provided, one through hole 15 on the third row r3, on which other six fixing members 14a are provided, and one through hole 15 on the second row r2, on which two fixing members 14b are provided. This is because as described in the first and second verifications, the less the through holes 15, the greater the deformation suppressing efficiency achieved. By providing the through holes 15 on the circuit board 12, the imaging unit 10 of the embodiment can reduce the Young's modulus of the circuit board 12 (i.e., it can reduce the rigidity of the circuit board 12), thereby reducing the deformation of the circuit board 12 and the image pickup element 11. Specifically, the imaging unit 10 reduces the deformation of the circuit board 12 and the image pickup element 11 by providing the through holes 15 that have a similar dimension of the fixing members 14.

As described above, the imaging unit 10 of the first embodiment according to the disclosure includes the through holes 15 on the circuit board 12 to reduce the rigidity of the circuit board 12. With this, the imaging unit 10 reduces deformation of the circuit board 12 and the image pickup element 11 caused by a temperature change. That is, the imaging unit 10 suppresses deformation of the image pickup element 11 by only providing the through holes 15 on the circuit board 12, i.e., the imaging unit 10 easily suppresses deformation of the image pickup element 11 without an additional member.

Further, the imaging unit 10 of the first embodiment suppresses deformation of the imaging surface 11a by suppressing the deformation of the image pickup element 11. Accordingly, the imaging unit 10 suppresses a change of the optical path length and/or a shift of the image plane so as to suppress deterioration in the optical performance. Additionally, the imaging unit 10 suppresses stress on the fixing members 14. With this, the imaging unit 10 suppresses deformation of the fixing members 14 caused by a temperature change, thereby maintaining an appropriate fixing state of the image pickup element 11 on the circuit board 12.

In the imaging unit 10, when the plurality of the fixing members 14 is provided on a straight line extending in the longitudinal direction Dl of the long image pickup element 11; the imaging unit 10 includes at least one through hole 15 along the straight line. With this, the imaging unit 10 efficiently suppresses the deformation of the image pickup element 11 by improving the deformation suppressing efficiency expressed by the ratio of the reduction amount in the deformation related to the opening areas (i.e., the reduction amount in the deformation/opening areas).

The imaging unit 10 includes the through holes 15 at positions where the circuit board 12 and the image pickup element 11 are superimposed in the thickness direction Dt. With this, the imaging unit 10 efficiently suppresses the deformation of the image pickup element 11.

In the imaging unit 10, the dimension of the through holes 15 is similar to the dimension of the fixing members 14. With this, the imaging unit 10 efficiently suppresses the deformation of the image pickup element 11.

In the imaging unit 10, the through holes 15 are provided at positions between the fixing members 14 on the straight lines extending in the longitudinal direction Dl, on which the plurality of the fixing members 14 is provided. With this, the imaging unit 10 efficiently provides the through holes 15 and suppresses the deformation of the image pickup element 11.

The imaging unit 10 includes the through holes 15 to improve the deformation suppressing efficiency. Accordingly, the imaging unit 10 secures a space for wiring the signal lines. That is, the imaging unit 10 minimizes the decrease of the flexibility of the layout of the signal lines on the circuit board 12. As a result, it avoids increasing the size of the circuit board 12 only for securing the space for the signal lines.

As illustrated in FIG. 6, the imaging unit 10 includes one through hole 15 on the first row r1, on which six fixing members 14a are provided, one through hole 15 on the third row r3, on which other six fixing members 14a are provided, and one through hole 15 on the second row r2, on which two fixing members 14b are provided. That is, the imaging unit 10 reduces the number of the through holes 15. As a result, the imaging unit 10 reduces the deformation amount of the image pickup element 11 while securing a sufficient space to wire the signal lines on the circuit board 12.

In the imaging unit 10, when the size (dimension) of the through holes 15 is smaller than that of the fixing members 14, a space is found between each through hole 15 and each fixing member 14 on the circuit board 12. Accordingly, the imaging unit 10 effectively reduces the area (opening area) of the through holes 15 while using the space between each through hole 15 and each fixing member 14 for wiring the signal lines.

In the imaging unit 10, the positions, shapes, dimensions, and the number of the through holes 15 are determined to satisfy the conditional equation (3). Therefore, the positions, shapes, dimensions, and the number of the through holes 15 are easily and explicitly determined. Further, the imaging unit 10 suppresses the deformation of the image pickup element 11 by efficiently providing the through holes 15.

In the imaging unit 10, the positions, shapes, dimensions, and the number of the through holes 15 are determined to satisfy the conditional equation (4). That is, the dimension of each of the through holes 15 in the short direction Ds is determined in accordance with the dimension of the fixing members 14. As a result, the imaging unit 10 suppresses the deformation of the image pickup element 11 by efficiently providing the through holes 15.

In the imaging unit 10, the positions, shapes, dimensions, and the number of the through holes 15 are determined to satisfy the conditional equation (5). Accordingly, when the plurality of the fixing members 14 are provided along the long-side edge parts (i.e., on the first row r1 and the third row r3) of the image pickup element 11, the imaging unit 10 efficiently provides the through holes 15 at the positions between the corresponding fixing members on the long-side edge parts.

The image reader 102 of the first embodiment of the image reading device according to this disclosure includes the imaging unit 10 of the first embodiment as an image sensor of the integrally formed scanning optical unit 301. Accordingly, the deformation of the image pickup element 11 and the circuit board 12 caused by a temperature change is reduced by the imaging unit 10 of the image reader 102. Therefore, the integrally formed scanning optical unit 301 exhibits the optical performance according to its design. That is, the image reader 102 can read an image on a manuscript Ma appropriately regardless of a change in the environmental temperature.

Since the image forming apparatus 100 including the image reader 102 can read an image on a manuscript Ma appropriately regardless of a change in the environmental temperature, the image forming apparatus 100 can output proper images.

As described above, the imaging unit 10 of the first embodiment suppresses the deformation of the image pickup element 11 caused by a temperature change without an additional member.

In the first embodiment, the imaging unit 10 is configured such that the through holes 15 are provided on the circuit board 12. However, it should not be limited thereto. For instance, the through holes 15 may be stuffed with stuffing members having a lower rigidity than the circuit board 12. The stuffing members may seal the through holes 15 completely or may decrease the internal diameter of the through holes 15. The stuffing members may be caps formed with adhesives or elastic members. The stuffing members may also be used on the surface of the circuit board 12, and/or between the image pickup element 11 and the circuit board 12 so as to prevent dust from attaching on the image pickup element 11 and the circuit board 12. Since the stuffing members have a lower rigidity than the circuit board 12, the rigidity of the entire circuit board 12 is lowered by including the through holes 15 and the stuffing members. Therefore, it also achieves the above-mentioned effects.

In the first embodiment, one through hole 15 is provided on each of the first row r1, second row r2, and third row r3 on the circuit board 12 as illustrated in FIG. 6. However, as long as at least one through hole 15 is provided on each of the rows that are provided with the plurality of the fixing members and are parallel to the longitudinal direction Dl; the position of the through hole 15 on each of the rows should not be limited thereto.

In the first embodiment, the image pickup element 11 is configured to have a plate-like shape (thin rectangular parallelepiped shape). However, as long as the image pickup element 11 is fixed to and mounted on the circuit board 12 by the plurality of the fixing members 14 (e.g., a flip-chip mounting), the shape of the image pickup element 11 should not be limited thereto.

In the first embodiment, the through holes 15 are configured to have a rectangular shape. However, it should not be limited thereto. For instance, the through holes 15 may have a circular shape, an ellipse shape, or a polygonal shape.

In the first embodiment, the through holes 15 have substantially the same dimensions. However, it should not be limited thereto. That is, the through holes 15 may have different dimensions from each other.

Embodiment 2

Next, an imaging unit 10A of a second embodiment according to this disclosure will be described with reference to FIG. 26. In the second embodiment, positions and the number of through holes ISA and fixing members 14 are different from those of the imaging unit 10 of the first embodiment. Though, the imaging unit 10A of the second embodiment basically has a similar concept and configuration to those of the imaging unit 10 of the first embodiment. Therefore, the same components are indicated by the same reference signs and detailed explanations thereof are omitted.

Figure 26:
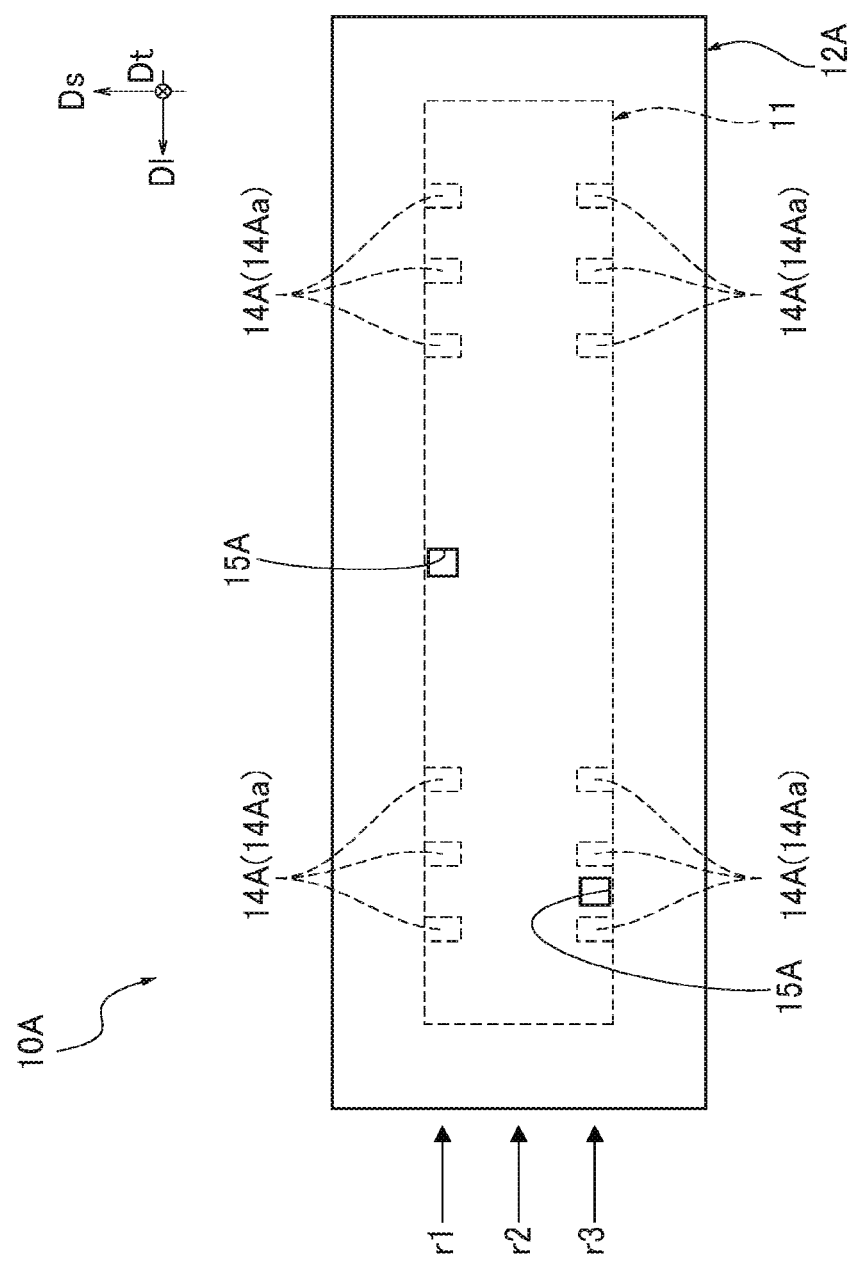
FIG. 26 is an explanatory view of an example of an imaging unit having through holes on a circuit board of a second embodiment according to the present invention.

As illustrated in FIG. 26, the imaging unit 10A of the second embodiment includes, on the circuit board 12A, six fixing members 14A to fix the image pickup element 11 along each long-side edge part of the image pickup element 11. Specifically, three fixing members 14A are provided at each side on the long-side edge parts of the image pickup element 11. In the second embodiment, each of the fixing members 14A is a connecting pin to electrically connect the image pickup element 11 to the circuit board 12 (specifically, to the circuit printed on the circuit board) and to fix the image pickup element 11 on the circuit board 12. Hereinafter, the fixing members 14A of the second embodiment are also referred to as the fixing members 14Aa. The imaging unit 10A does not have a fixing member on the second row r2.

On the circuit board 12A, one through hole 15A is provided at a middle of the six fixing members 14Aa on the first row r1 (i.e., between a group of the three fixing members 14A and the other group of the three fixing members 14Aa). Further, another through hole 15A is provided at a middle of the two fixing members 14Aa provided at the left end on the third row r3 (i.e., between two fixing members 14Aa among the three fixing members 14Aa provided at the left end on the third row r3). As described above, the imaging unit 10A of the second embodiment includes one through hole 15A on each straight line (i.e., rows r1 and r3) extending in the longitudinal direction Dl, on which the plurality of the fixing members 14A is provided. That is, the imaging unit 10A of the second embodiment includes each of the through holes 15A at the position between two fixing members 14A on each straight line (i.e., rows r1 and r3).

As described above, the imaging unit 10A of the second embodiment does not include the fixing member 14b on the second row r2, and therefore, does not include a through hole 15A on the second row r2 either. The imaging unit 10A includes the through holes 15A at the positions between the two fixing members 14Aa on the first row r1 and the two fixing members 14Aa on the third row r3. The imaging unit 10A of the second embodiment reduces Young's modulus of the circuit board 12A, i.e., the rigidity of the circuit board 12A, by providing the through holes 15A on the circuit board 12A. Accordingly, the imaging unit 10A reduces the deformation of the circuit board 12A and the image pickup element 11. That is, the imaging unit 10A reduces the deformations of the circuit board 12A and the image pickup element 11 by providing the through holes 15A having a similar dimension of the fixing members 14A.

Since the imaging unit 10A of the second embodiment has a similar configuration to the imaging unit 10 of the first embodiment, the imaging unit 10A basically achieves the same effects.

Further, the imaging unit 10A of the second embodiment includes the through holes 15A in accordance with the positions of the fixing members 14A, which fix the circuit board 12A and the image pickup element 11. As clearly shown by the first to fifth verifications of the first embodiment, the imaging unit 10A reduces the rigidity of the circuit board 12A so as to reduce the deformations of the circuit board 12A and the image pickup element 11 caused by a temperature change.

Consequently, the imaging unit 10A of the second embodiment suppresses the deformations of the image pickup element 11 caused by a temperature change without an additional member.

Embodiment 3

Next, an imaging unit 10B of a third embodiment according to this disclosure will be described with reference to FIG. 27. In the imaging unit 10B of the third embodiment, positions and the number of through holes 15B and fixing members 14 are different from those of the imaging unit 10 of the first embodiment. Though, the imaging unit 10B of the third embodiment basically has a similar concept and configuration to those of the imaging unit 10 of the first embodiment. Therefore, the same components are indicated by the same reference signs and detailed explanations thereof are omitted.

Figure 27:
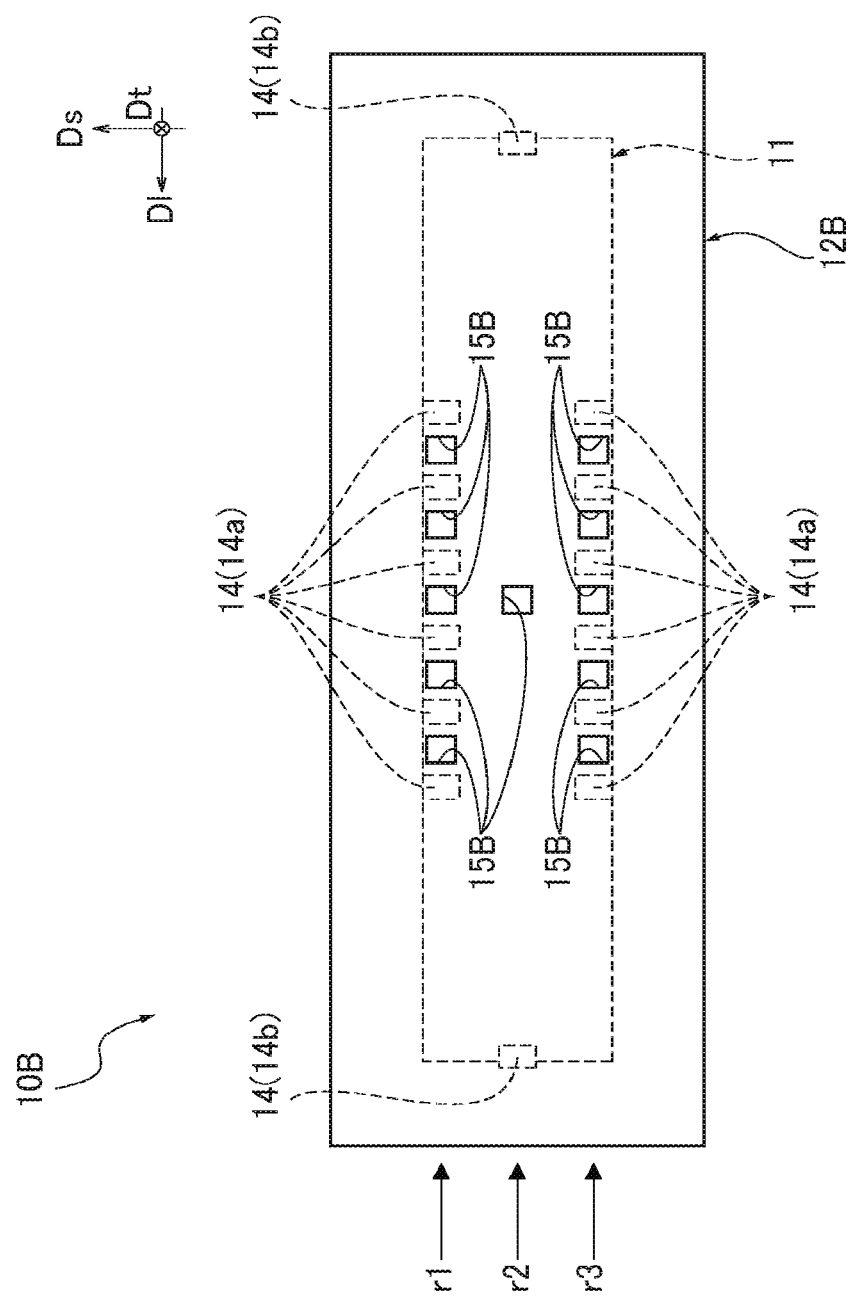
FIG. 27 is an explanatory view of an example of an imaging unit having through holes on a circuit board of a third embodiment according to the present invention.

As illustrated in FIG. 27, similar to the circuit board 12 of the first embodiment, the imaging unit 10B of the third embodiment includes six fixing members 14a on each of a first row r1 and a third row r3, and two fixing members 14b on a second row r2. The circuit board 12B includes five through holes 15B at positions between the six fixing members 14a respectively on each of the first row r1 and the third row r3. Further, the circuit board 12B includes one through hole 15B in the middle of the two fixing members 14b on the second row r2. That is, the imaging unit 10B of the third embodiment includes through holes 15B at the positions between the corresponding two fixing members 14 on each of the first to third rows r1, r2, r3 extending in the longitudinal direction Dl, on which the fixing members 14 are provided.

As described above, the imaging unit 10B of the third embodiment respectively includes the through hole 15B at the position between each of the corresponding fixing members 14 on the first row r1, on which six fixing members 14a are provided, on the second row r2, on which two fixing members 14b are provided, and on the third row r3, on which six fixing members 14a are provided. As described in the fourth verification of the first embodiment, by providing the through hole 15B at the position between each of the fixing members 14a, the deformation amount δ is reduced with a high deformation suppressing efficiency even if the size of the through holes 15B is smaller than that of the first to third verifications. That is, by providing the through holes 15B on the circuit board 12B, the imaging unit 10B reduces the Young's modulus of the circuit board 12B (i.e., reduces the rigidity thereof) so as to reduce the deformation of the circuit board 12B and image pickup element 11. As described before, the imaging unit 10B reduces the deformation of the circuit board 12B and image pickup element 11 by providing the through hole 15B, which has a similar size to the fixing members 14, at the position between each of the fixing members 14 aligned parallel to the longitudinal direction Dl.

Since the imaging unit 10B of the third embodiment has a similar configuration to the imaging unit 10 of the first embodiment, the imaging unit 10B basically achieves the same effects.

Additionally, since the imaging unit 10B of the third embodiment includes the through hole 15B at the position between each of the fixing members 14 aligned in the longitudinal direction Dl, the imaging unit 10B further reduces the rigidity of the circuit board 12B so as to further reduce the deformation of the circuit board 12B and image pickup element 11. As a result, the imaging unit 10B further reduces the deformation of the circuit board 12B and image pickup element 11 caused by a temperature change.

Consequently, the imaging unit 10B of the third embodiment suppresses deformation of the image pickup element 11 caused by a temperature change without an additional member.

Embodiment 4

Next, an imaging unit 10C of a fourth embodiment according to this disclosure will be described with reference to FIG. 28. In the imaging unit 10C of the fourth embodiment, positions and the number of through holes 15C and fixing members 14A are different from those of the imaging unit 10 of the first embodiment. Though, the imaging unit 10C of the fourth embodiment basically has a similar concept and configuration to those of the imaging unit 10 of the first embodiment. Therefore, the same components are indicated by the same reference signs and detailed explanations thereof are omitted.

Figure 28:
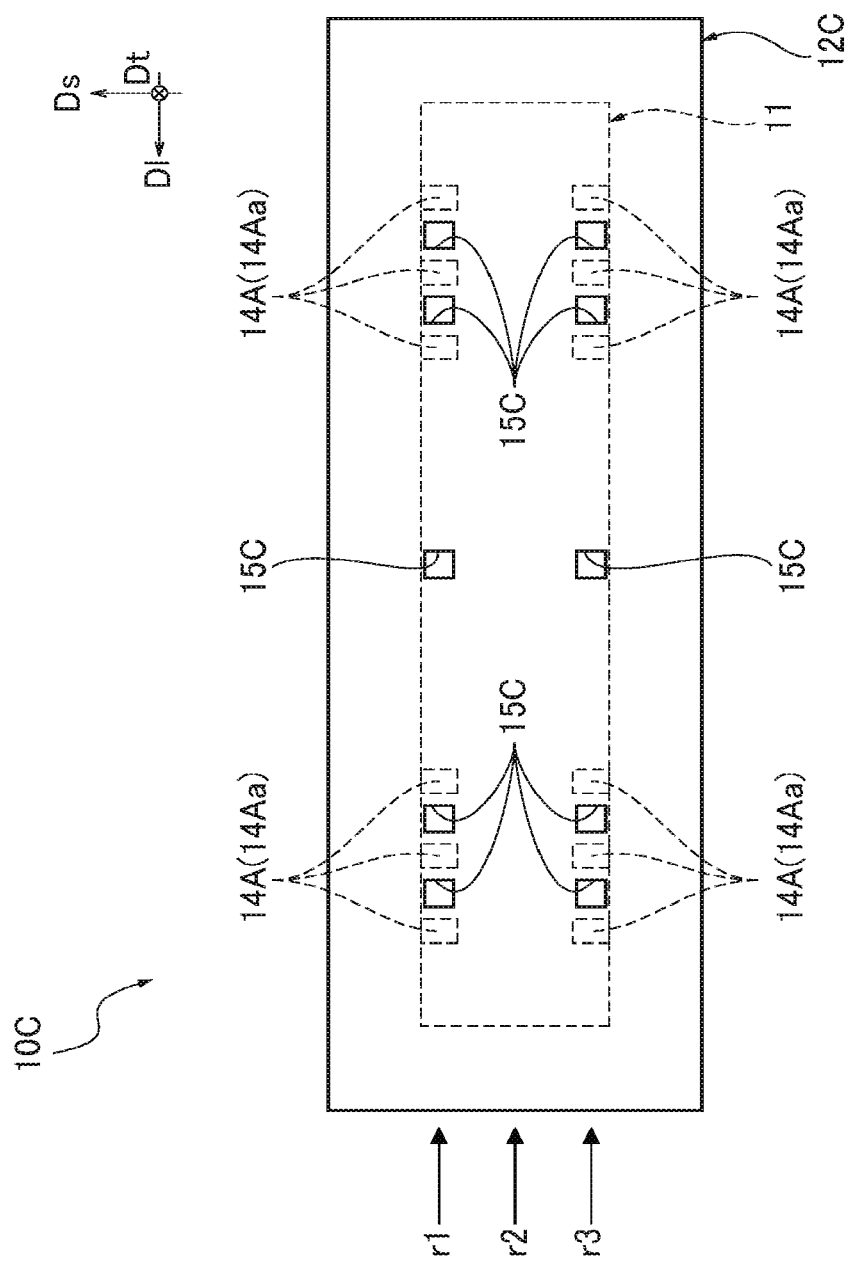
FIG. 28 is an explanatory view of an example of an imaging unit having through holes on a circuit board of a fourth embodiment according to the present invention.

As illustrated in FIG. 28, similar to the circuit board 12A of the second embodiment, the imaging unit 10C of the fourth embodiment includes three fixing members 14Aa at each side on a first row r1 and a third row r3 (i.e., includes six fixing members 14Aa on each of the first and third rows r1, r3). Also, the imaging unit 10C does not have a fixing member on a second row r2. The circuit board 12C includes five through holes 15C at positions between the six fixing members 14Aa respectively on each of the first row r1 and the third row r3. That is, the imaging unit 10C of the fourth embodiment includes the through hole 15 at the position between each of the fixing members 14A respectively on the straight lines (rows r1, r3), on which the plurality of the fixing members 14A are provided, extending in the longitudinal direction Dl.

As described above, the imaging unit 10C of the fourth embodiment includes the through hole 15C at the position between each of the six fixing members 14Aa respectively on the first row r1 and the third row r3. As described in the fourth verification of the first embodiment, by providing the through hole 15C at the position between each of the fixing members 14Aa, the deformation amount δ is reduced with a high deformation suppressing efficiency even if the size of the through holes 15C is smaller than that of the first to third verifications. That is, by providing the through holes 15C on the circuit board 12C, the imaging unit 10C reduces the Young's modulus of the circuit board 12C (i.e., reduces the rigidity thereof) so as to reduce the deformation of the circuit board 12C and image pickup element 11. As described before, the imaging unit 10C reduces the deformation of the circuit board 12C and image pickup element 11 by providing the through hole 15C, which has a similar size to the fixing members 14A, at the position between each of the fixing members 14A aligned parallel to the longitudinal direction Dl.

Since the imaging unit 10C of the fourth embodiment has a similar configuration to the imaging unit 10 of the first embodiment, the imaging unit 10C basically achieves the same effects.

Additionally, since the imaging unit 10C of the fourth embodiment respectively includes the through hole 15C at the position between each of the fixing members 14A aligned in the longitudinal direction Dl, the imaging unit 10C further reduces the rigidity of the circuit board 12C so as to further reduce the deformation of the circuit board 12C and image pickup element 11. As a result, the imaging unit 10C further reduces the deformation of the circuit board 12C and image pickup element 11 caused by a temperature change.

Consequently, the imaging unit 10C of the fourth embodiment suppresses deformation of the image pickup element 11 caused by a temperature change without an additional member.

Embodiment 5

Next, an imaging unit 10D of a fifth embodiment according to this disclosure will be described with reference to FIG. 29. In the imaging unit 10D of the fifth embodiment, positions and the number of through holes 15D and fixing members 14A are different from those of the imaging unit 10 of the first embodiment. Though, the imaging unit 10D of the fifth embodiment basically has a similar concept and configuration to those of the imaging unit 10 of the first embodiment. Therefore, the same components are indicated by the same reference signs and detailed explanations thereof are omitted.

Figure 29:
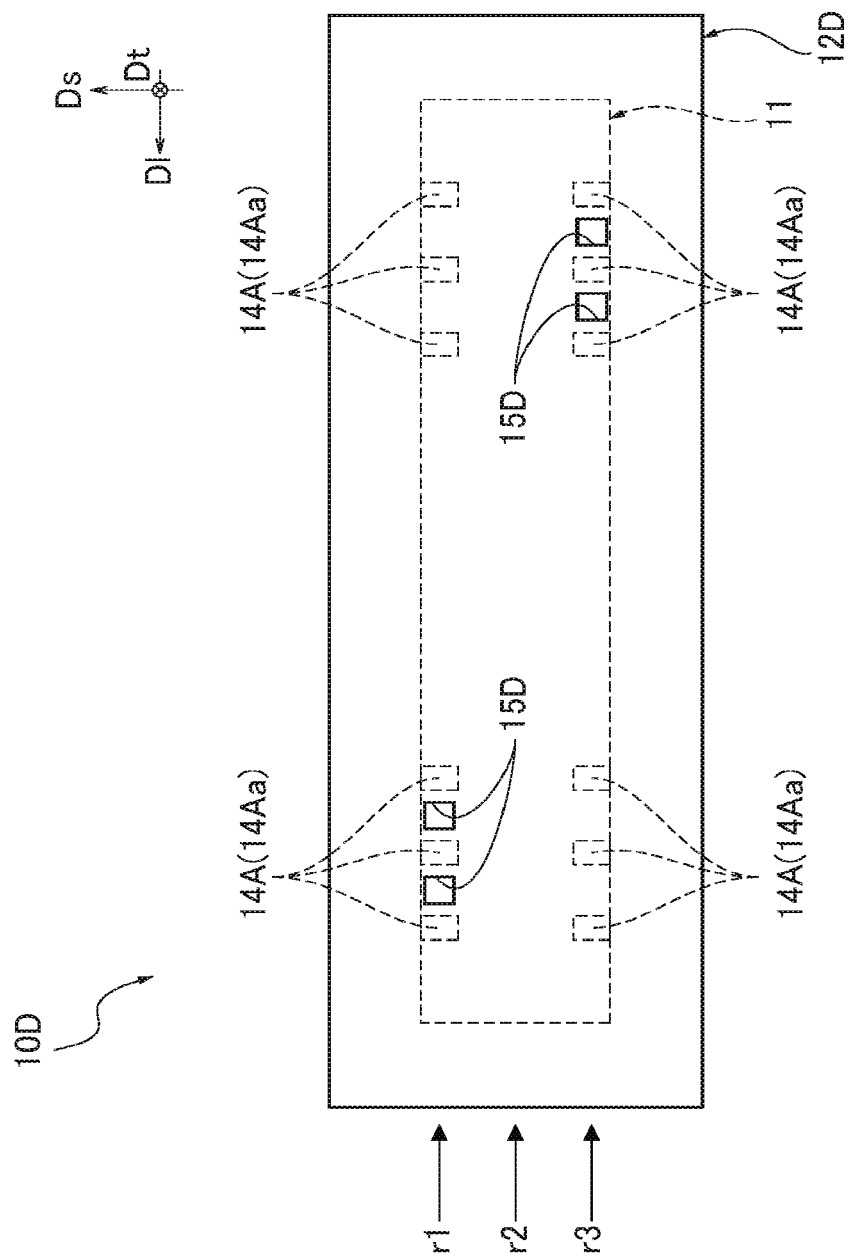
FIG. 29 is an explanatory view of an example of an imaging unit having through holes on a circuit board of a fifth embodiment according to the present invention.

As illustrated in FIG. 29, similar to the circuit board 12 of the second embodiment, the imaging unit 10D of the fifth embodiment includes, on the circuit board 12D, three fixing members 14Aa at each side on a first row r1 and a third row r3 (i.e., includes six fixing members 14Aa on each of the first and third rows r1, r3). Also, the imaging unit 10D does not include a fixing member on a second row r2. The circuit board 12D includes, on the first row r1, two through holes 15D at the positions between the three fixing members 14Aa positioned on the left side of the circuit board 12D. Further, the circuit board 12D includes, on the third row r3, two through holes 15D at the positions between the three fixing members 14Aa positioned on the right side of the circuit board 12D. That is, the imaging unit 10D of the fifth embodiment includes the through holes 15 at the positions between the fixing members 14A on the straight lines (rows r1, r3), on which the plurality of the fixing members 14A are provided, extending in the longitudinal direction Dl.

As described above, the imaging unit 10D of the fifth embodiment respectively includes a plurality of (e.g., two of) through holes 15D at the positions between the fixing members 14a on the first row r1, on which six fixing members 14a are provided, and on the third row r3, on which six fixing members 14a are provided. As described in the fourth verification of the first embodiment, the more the through holes, the less the deformation amount δ achieved. That is, the imaging unit 10D is configured to improve the deformation suppressing efficiency while reducing the deformation amount δ. As described above, by providing the through holes 15D on the circuit board 12D, the imaging unit 10D reduces the Young's modulus of the circuit board 12D (i.e., reduces the rigidity thereof) so as to reduce the deformation of the circuit board 12D and image pickup element 11. That is, the imaging unit 10D reduces the deformation of the circuit board 12D and image pickup element 11 by providing the plurality of the through holes 15D, which have a similar size to the fixing members 14A, at the positions between the fixing members 14A aligned parallel to the longitudinal direction Dl.

Since the imaging unit 10D of the fifth embodiment has a similar configuration to the imaging unit 10 of the first embodiment, the imaging unit 10D basically achieves the same effects.

Additionally, the imaging unit 10D of the fifth embodiment respectively includes a plurality of (e.g., two of) through holes 15D at the positions between the fixing members 14A aligned in the longitudinal direction Dl. As a result, the imaging unit 10D further reduces the rigidity of the circuit board 12D so as to further reduce the deformation of the circuit board 12D and image pickup element 11 while reducing the area (opening area) of the through holes 15D on the circuit board 12D. That is, the imaging unit 10D further reduces the deformation of the circuit board 12D and image pickup element 11 caused by a temperature change while reducing the opening area of the through holes 15D.

Consequently, the imaging unit 10D of the fifth embodiment suppresses deformation of the image pickup element 11 caused by a temperature change without an additional member.

Note the imaging unit 10D of the fifth embodiment includes two through holes 15 at the positions between the fixing members 14A respectively on each of the first row r1 and the third row r3. However, as long as a plurality of the through holes 15 are respectively provided at the positions between the fixing members 14A on the straight lines (rows r1 and r3) on which a plurality of the fixing members 14A is provided, the number and the positions of the through holes 15 may be appropriately selected and should not be limited thereto.

Embodiment 6

Next, an imaging unit 10E of a sixth embodiment according to this disclosure will be described with reference to FIG. 30. In the imaging unit 10E of the sixth embodiment, positions and the number of through holes 15E and fixing members 14A are different from those of the imaging unit 10 of the first embodiment. Though, the imaging unit 10E of the sixth embodiment basically has a similar concept and configuration to those of the imaging unit 10 of the first embodiment. Therefore, the same components are indicated by the same reference signs and detailed explanations thereof are omitted.

Figure 30:
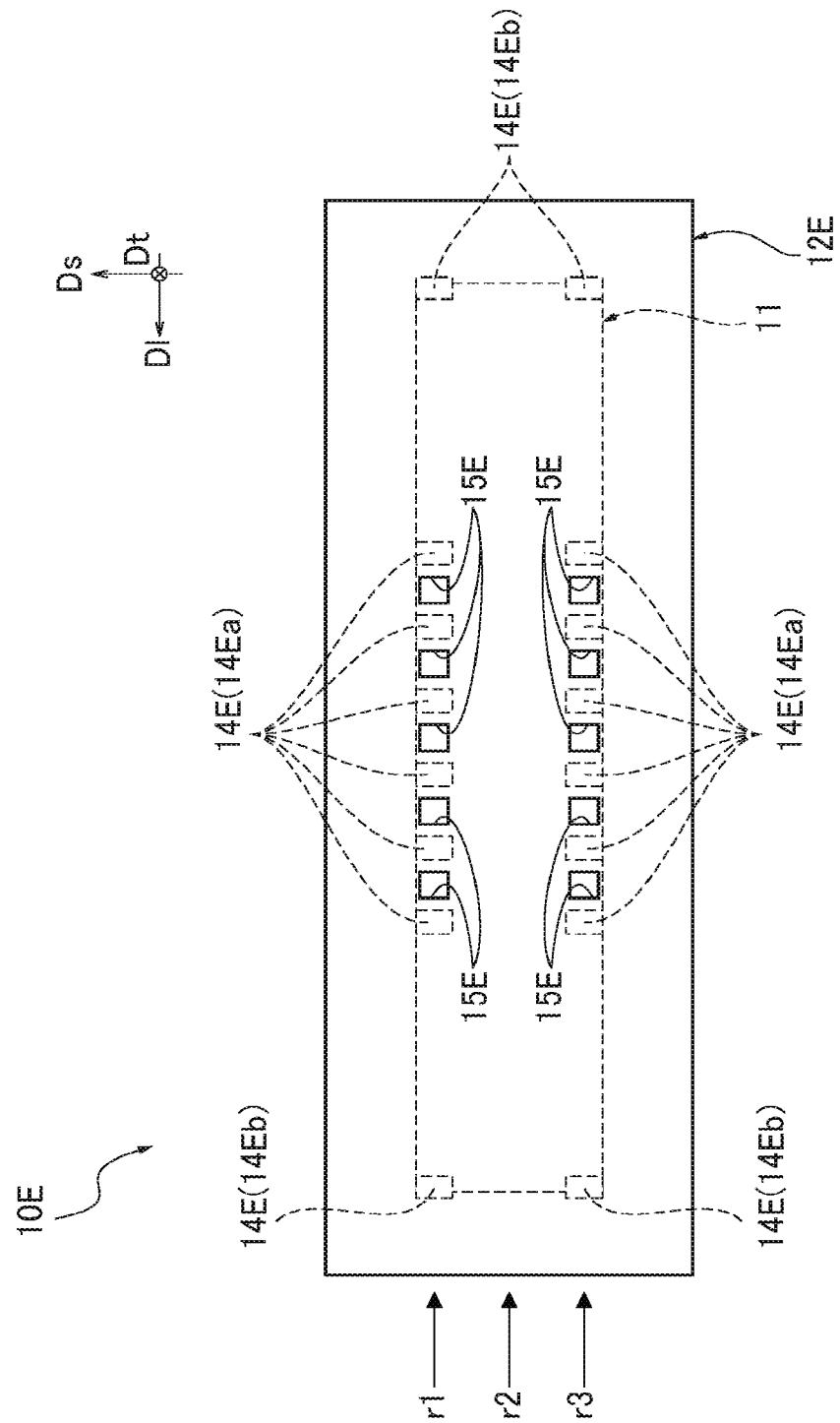
FIG. 30 is an explanatory view of an example of an imaging unit having through holes on a circuit board of a sixth embodiment according to the present invention.

As illustrated in FIG. 30, the imaging unit 10E of the sixth embodiment includes, on the circuit board 12E, eight fixing members 14E along each long-side edge part of the image pickup element 11. To be specific, six of the fixing members 14E are provided at the center of each of the long-side edge parts and two of the fixing members 14E are provided at corners (end parts) of each of the long-side edge parts. In the sixth embodiment, the six fixing members 14E are connecting pins to electrically connect the image pickup element 11 to the circuit board 12E (specifically, to the circuit printed on the circuit board) and to fix the image pickup element 11 on the circuit board 12E. Hereinafter, the six fixing members 14E of the sixth embodiment are also referred to as the fixing members 14Ea. The two fixing members 14E provided at the corners of each of the long-side edge parts are extra pins and do not have a function to electrically connect the image pickup element 11 to the circuit board 12E but supplementarily fixes the element 11 to the circuit board 12E. Hereinafter, the two fixing members 14E of the sixth embodiment are also referred to as the fixing members 14Eb. That is, the imaging unit 10E includes, on the circuit board 12E, the six fixing members 14Ea aligned at the center and the two fixing members 14Eb separated from the six fixing members 14Ea on each of the first row r1 and the third row r3. Further, the imaging unit 10E does not include a fixing member on the second row r2.

The imaging unit 10E includes, on the circuit board 12E, five through holes 15E at the positions between the six fixing members 14Ea respectively on each of the first and third rows r1 and r3. Here, the imaging unit 10E does not include a through hole at positions between the group of the six fixing members 14Ea and the corresponding fixing members 14Eb, which are provided at the corners, on the first and third rows r1 and r3. That is, the imaging unit 10E of the sixth embodiment includes the through hole 15E at the position between each of the connecting pins (fixing members 14Ea) respectively on the first and third rows r1 and r3.

As described above, the imaging unit 10E of the sixth embodiment does not include a fixing member 14 on the second row r2, thereby not including a through hole 15E either. Further, the imaging unit 10E includes the through hole 15E at the position between each of the connecting pins (i.e., fixing members 14Ea) respectively on the first row r1 and third row r3, but not includes a through hole at a position between the fixing members 14Ea and the fixing members 14Eb separated from the six fixing members 14Ea. Note that since the fixing members 14Eb are extra pins, the configuration of the imaging unit 10E is substantially identical to the configuration in which only six of the fixing members 14Ea are provided at the center on each of the first and third rows r1 and r3. Here, as described, the fourth verification of the first embodiment is configured such that the through hole 15C is provided at the position between each of the fixing members 14Aa, which are provided at the center of the first and third rows r1 and r3. As described above, the fourth verification reduces the deformation amount δ with a high deformation suppressing efficiency even with smaller through holes 15C than the through holes of the first to third verifications. Since the imaging unit 10E of the sixth embodiment has a similar configuration to that of the fourth verification, the imaging unit 10E of the sixth embodiment achieves substantially the same effects as that of the fourth verification of the first embodiment.

Since the fixing members 14Ea used as the connecting pins are more important than the fixing members 14Eb used as the extra pins, the imaging unit 10E is configured as described above to improve the deformation suppressing efficiency while reducing the deformation amount δ sufficiently. The imaging unit 10E reduces the Young's modulus of the circuit board 12E (i.e., the rigidity of the circuit board 12E) by providing the through holes 15E on the circuit board 12E so as to reduce the deformation of the circuit board 12E and image pickup element 11. That is, the imaging unit 10E reduces the deformation of the circuit board 12E and image pickup element 11 by providing the through holes 15E, which have a similar size to the fixing members 14E.

Since the imaging unit 10E of the sixth embodiment has a similar configuration to the imaging unit 10 of the first embodiment, the imaging unit 10E basically achieves the same effects.

Additionally, the imaging unit 10E of the sixth embodiment respectively includes the through holes 15E at the positions between the fixing members 14Ea (connecting pins). As a result, the imaging unit 10E further reduces the rigidity of the circuit board 12E so as to further reduce the deformation of the circuit board 12E and image pickup element 11 while reducing the area (opening area) of the through holes 15E on the circuit board 12E. That is, the imaging unit 10E further reduces the deformation of the circuit board 12E and image pickup element 11 caused by a temperature change while reducing the opening area of the through holes 15E.

Consequently, the imaging unit 10E of the sixth embodiment suppresses deformation of the image pickup element 11 caused by a temperature change without an additional member.

The imaging unit 10E of the sixth embodiment includes the through hole 15E at the position between each of the fixing members 14Ea respectively on each of the first row r1 and the third row r3. However, as long as a plurality of the through holes 15 is respectively provided at positions between the fixing members 14Ea on the straight lines (rows r1 and r3), on which the fixing members 14Ea (i.e., connecting pins) are provided, the number and the positions of the through holes 15 may be appropriately selected and should not be limited thereto.

In the above embodiments, the imaging units 10, 10A, 10B, 10C, 10D, and 10E are described as an example of the imaging unit of this disclosure. However, the imaging unit of this disclosure should not be limited to these embodiments.

In the above embodiments, the imaging units include the connecting pins (14a, 14Aa, 14Ea) and the extra pins (14b, 14Eb) as the fixing members (14, 14A, 14E). However, the fixing members should not be limited thereto. For instance, the fixing members may be adhesive, screws, soldering, or the like.

In the above embodiments, the image pickup element 11 is fixed to the circuit board 12 with the fixing members 14 provided on the opposite side of the imaging surface 11a. However, the configuration of the fixing members 14 should not be limited thereto. However, in case where the circuit board 12 is provided on the imaging surface 11a, the circuit board 12 needs to include an opening as large as the imaging surface 11a to secure the optical path to the imaging surface 11a. This opening unavoidably extends across a plurality of fixing members 14 in the short direction Ds or in the longitudinal direction Dl. This means, the dimension (size) of the opening is not similar to that of the fixing members 14, and therefore, the opening does not correspond to the through holes 15 of this disclosure.

In the above embodiments, the image forming apparatus 100 is illustrated as a tandem-type color printer to form a full-colored image. However, it should not be limited thereto. That is, any image forming apparatus that is configured to include an image reading device configured to read a manuscript as image information by imaging light reflected on the manuscript onto the imaging unit, and is configured to form an image based on the acquired image information output from the image reading device is applicable in this disclosure.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An imaging unit, comprising:
an image pickup element;
a circuit board including a circuit to drive the image pickup element; and
a plurality of fixing members to fix the image pickup element and the circuit board to each other, wherein
the circuit board includes at least one through hole on a straight line that extends in a longitudinal direction of the image pickup element and is provided with the plurality of the fixing members,
the through hole is provided at a position between at least two of the plurality of the fixing members on the straight line, and
a linear dimension of at least one of the through holes in a width direction orthogonal to the longitudinal direction of the image pickup element is greater than a half of a linear dimension of the plurality of the fixing members in the width direction.

2. The imaging unit according to claim 1, wherein the through hole is provided at a position where a shortest distance to the plurality of the fixing members is shorter than a half of a dimension of the image pickup element in a width direction of the image pickup element orthogonal to the longitudinal direction.

3. The imaging unit according to claim 1, wherein the through hole is provided at a position between each of the fixing members respectively.

4. The imaging unit according to claim 1, wherein at least two of the plurality of the fixing members on the straight line are connecting pins that electrically connect the image pickup element and the circuit board, and
the though-hole is provided at a position between the connecting pins.

5. The imaging unit according to claim 4, wherein the through hole is provided at a position between each of the connecting pins.

6. The imaging unit according to claim 1, wherein the through hole is stuffed with a stuffing member having a lower rigidity than the circuit board.

7. An image reading device, comprising:
the imaging unit according to claim 1, wherein
the image reading device is configured to read image information on a manuscript by imaging light reflected by the manuscript onto the imaging unit.

8. An image forming apparatus, comprising:
the image reading device according to claim 7, wherein the image forming apparatus is configured to form an image based on the image information output from the image reading device.

\* \* \* \* \*